(12) United States Patent
Saitoh

(10) Patent No.: US 10,657,514 B2
(45) Date of Patent: May 19, 2020

(54) SETTLEMENT TERMINAL DEVICE

(71) Applicant: PANASONIC INTELLECTUAL PROPERTY MANAGEMENT CO., LTD., Osaka (JP)

(72) Inventor: Kazuki Saitoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 644 days.

(21) Appl. No.: 15/304,893

(22) PCT Filed: May 25, 2015

(86) PCT No.: PCT/JP2015/002615
§ 371 (c)(1),
(2) Date: Oct. 18, 2016

(87) PCT Pub. No.: WO2015/182104
PCT Pub. Date: Dec. 3, 2015

(65) Prior Publication Data
US 2017/0140364 A1 May 18, 2017

(30) Foreign Application Priority Data
May 28, 2014 (JP) .................... 2014-109796

(51) Int. Cl.
*G06Q 20/24* (2012.01)
*G07G 1/12* (2006.01)
(Continued)

(52) U.S. Cl.
CPC ............ *G06Q 20/24* (2013.01); *G06K 7/087* (2013.01); *G06Q 20/20* (2013.01); *G06Q 20/34* (2013.01);
(Continued)

(58) Field of Classification Search
CPC ........ G07F 7/0886; G07F 7/0873; G07F 7/10; G07F 7/1025; G06F 21/83; G06F 21/84;
(Continued)

(56) References Cited

U.S. PATENT DOCUMENTS 5,757,369 A * 5/1998 Ohsawa ................ G06F 1/1626
715/750
6,556,189 B1 * 4/2003 Takahata ................ G06F 3/041
178/18.03
(Continued)

FOREIGN PATENT DOCUMENTS

JP 02-018608 1/1990
JP 2003-016527 1/2003
(Continued)

OTHER PUBLICATIONS

Search Report issued in International Patent Application No. PCT/JP2015/002615, dated Jul. 7, 2015.

*Primary Examiner* — Christopher Stanford
(74) *Attorney, Agent, or Firm* — Greenblum & Bernstein, P.L.C.

(57) ABSTRACT

A settlement terminal device according to the present invention includes: a first information processor that is placed in a housing which is gripped by an operator, and is provided with a first user interface (first touch panel) on one surface (operation display surface) of the housing; a secured second information processor that is placed in the housing, and is provided with a tamper-resistant second user interface (second touch panel), which can perform a securable operation, on one surface of the housing; and one light transmitting member (surface panel) that is disposed to cover a surface of the first user interface and a surface of the second user interface.

23 Claims, 24 Drawing Sheets

(51) Int. Cl.
*H04M 1/725* (2006.01)
*G06K 7/08* (2006.01)
*G06Q 20/20* (2012.01)
*G06Q 20/34* (2012.01)

(52) U.S. Cl.
CPC .......... *G07G 1/12* (2013.01); *H04M 1/72522* (2013.01); *H04M 2250/14* (2013.01)

(58) Field of Classification Search
CPC ......... G06F 21/74; G06F 21/06; G06Q 20/20; G06Q 20/4012
See application file for complete search history.

(56) References Cited

U.S. PATENT DOCUMENTS

| | | | | |
|---|---|---|---|---|
| 6,630,928 | B1* | 10/2003 | McIntyre | G06F 3/04886 345/173 |
| 6,965,375 | B1* | 11/2005 | Gettemy | G06F 3/0412 178/18.03 |
| 7,348,964 | B1* | 3/2008 | Gettemy | G06F 3/045 345/173 |
| 8,376,219 | B1 | 2/2013 | Kropf et al. | |
| 9,213,364 | B2* | 12/2015 | Autran | G06F 3/03547 |
| 9,727,146 | B2* | 8/2017 | Kang | G06F 3/03 |
| 2003/0004877 | A1* | 1/2003 | Kasasaku | G06Q 20/105 705/41 |
| 2004/0024710 | A1* | 2/2004 | Femando | G06F 21/6218 705/50 |
| 2005/0145690 | A1 | 7/2005 | Shibasaki | |
| 2006/0034042 | A1 | 2/2006 | Hisano et al. | |
| 2006/0211454 | A1* | 9/2006 | Park | H04M 1/0214 455/566 |
| 2008/0041933 | A1 | 2/2008 | Shibasaki | |
| 2009/0180244 | A1* | 7/2009 | Kiyohara | G02F 1/13338 361/679.01 |
| 2009/0254986 | A1* | 10/2009 | Harris | G06F 21/74 726/17 |
| 2010/0145854 | A1 | 6/2010 | Messerges et al. | |
| 2011/0034214 | A1* | 2/2011 | Hong | H04M 1/72522 455/566 |
| 2012/0062443 | A1* | 3/2012 | Baldischweiler | G02F 1/1347 345/1.3 |
| 2012/0173435 | A1 | 7/2012 | Komiyama | |
| 2012/0299831 | A1* | 11/2012 | Lioy | G06F 21/36 345/168 |
| 2013/0191925 | A1* | 7/2013 | Ditzman | G06F 21/83 726/26 |
| 2015/0020210 | A1* | 1/2015 | Brown | G06F 21/84 726/27 |
| 2015/0254624 | A1* | 9/2015 | Matsumoto | G07G 1/01 345/659 |
| 2015/0278557 | A1* | 10/2015 | Yasutomi | G06F 21/86 361/679.3 |
| 2015/0324615 | A1 | 11/2015 | Matsumoto et al. | |
| 2015/0324781 | A1 | 11/2015 | Saitoh | |

FOREIGN PATENT DOCUMENTS

| | | |
|---|---|---|
| JP | 2006-053678 | 2/2006 |
| JP | 2011-100401 | 5/2011 |
| WO | 2004/017255 | 2/2004 |

* cited by examiner

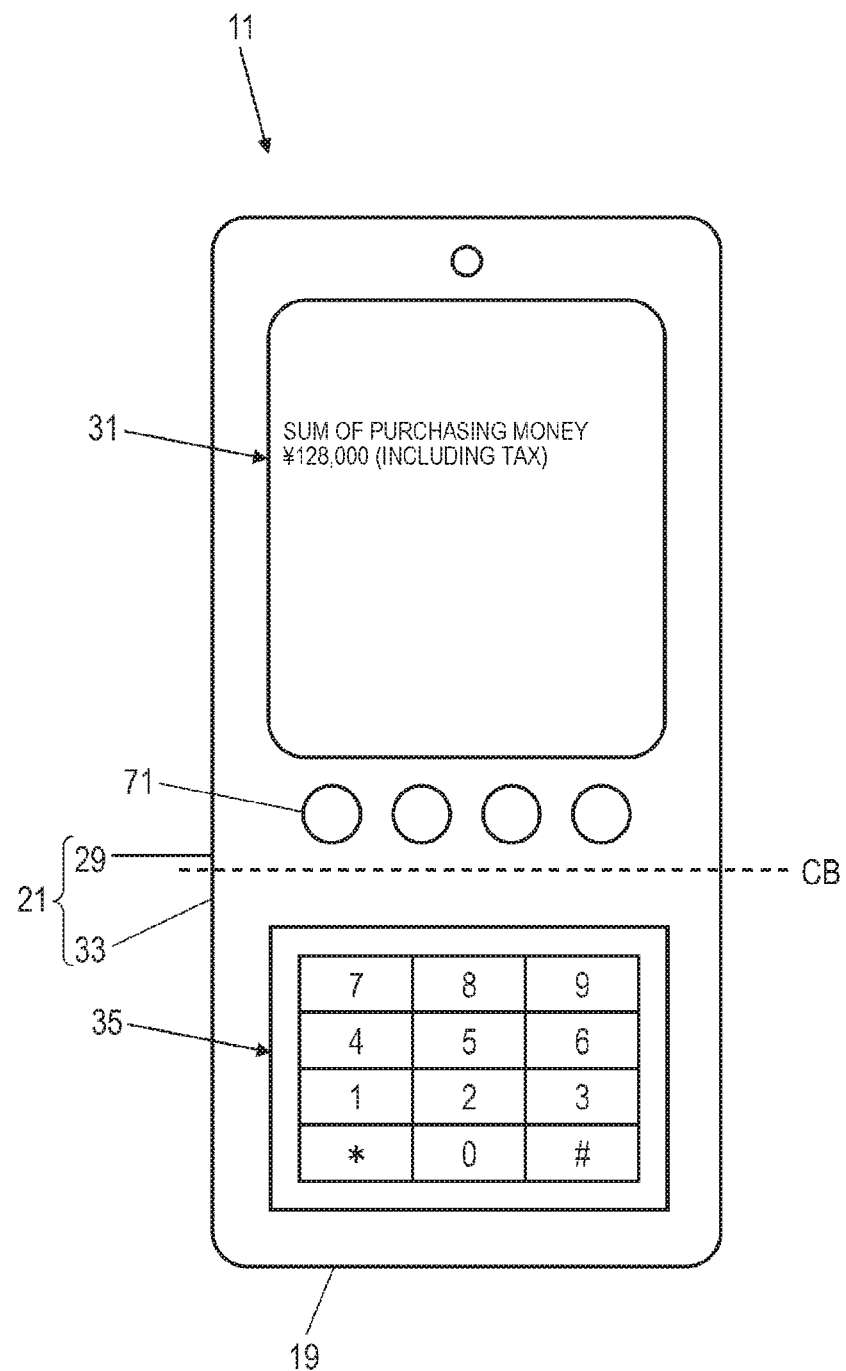

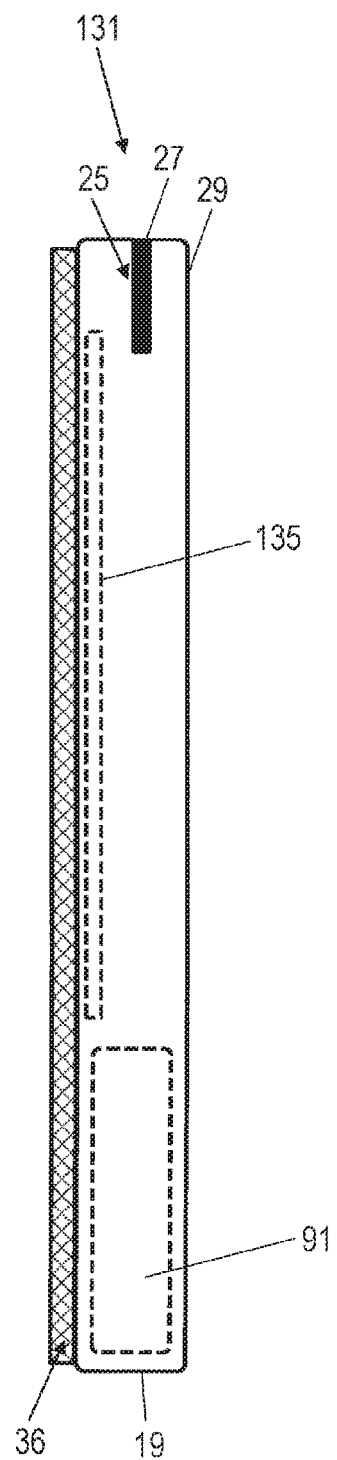

SETTLEMENT TERMINAL DEVICE

TECHNICAL FIELD

The present invention relates to a settlement terminal device and a transaction terminal device which are used to perform a settlement process during a transaction.

BACKGROUND ART

For example, in a product or service (credit) transaction using a credit card, the safety (security) of the transaction is secured by recognizing (personal verification) whether a person who performs the transaction is the same person as the owner of the credit card which is used in the transaction. The personal verification is performed in such a way that a customer signs signature on a transaction statement on which the transaction content is printed when a transaction settlement process is performed, and a clerk compares the signature with the signature signed on the credit card by sight.

In recent years, terminal devices, which can input and display signatures, have been realized using smart phones, tablet terminals, or the like. A plurality of smart phones and the tablet terminals are distributed as consumer devices, and thus it is possible to construct settlement terminal devices by obtaining the smart phones, the tablet terminals, or the like inexpensively. That is, in a case in which it is possible to form the settlement terminal devices using information terminals which are distributed in plural as consumer devices similarly to the smart phones, the tablet terminals, or the like, it is possible to obtain the settlement terminal devices inexpensively. In addition, since a wide use of application (software) development platform which is used in business other than in the settlement process becomes possible, and thus the reuse and distribution of the development resources become easy.

However, information terminals, which are designed to be mainly used as consumer devices, do not have "tamper resistance" which is necessary to safely perform a transaction while protecting customer information. The "tamper resistance" indicates tolerance to attacks that attempt to steal information from the information terminal. In order to secure tamper resistance as a measure to prevent the attacks that attempt to steal information from the information terminal, a mobile device is proposed in which a portion (in PTL 1, referred to as "secured portion". A portion which has tamper resistance necessary as the settlement terminal device), which is relevant to card authentication information used for the settlement process, is separated from a general-purpose portion (for example, refer to PTLs 1 and 2).

CITATION LIST

Patent Literature

PTL 1: Publication of US patent application 2010/0145854

PTL 2: U.S. Pat. No. 8,376,219

SUMMARY OF THE INVENTION

However, in an information processing device according to the related art including the above-described PTLs 1 and 2, a non-secured portion which does not have "tamper resistance" includes an input screen size equivalent to a general-purpose smart phone or a tablet terminal, and a secured portion is added thereto. Therefore, in the information processing device, it is difficult to secure the strength of a housing. Furthermore, even though the information processing device has a hybrid configuration including a non-secured portion and a secured portion, excellent operability should be secured in a case in which a finger, an input stylus pen, or the like moves between the secured portion and the general-purpose portion during the operation.

In view of the above-described situation according to the related art, an object of the present invention is to provide an information processing device that has robustness (falling impact resistance) even in a case in which a secured portion and a non-secured portion exist together, and secures operability in a case in which a finger, an input stylus pen, or the like moves between a secured portion and a general-purpose portion during the operation.

The present invention is a settlement terminal device including: a first information processor that is placed in a housing which is gripped by an operator, and is provided with a first user interface on one surface of the housing; a secured second information processor that is placed in the housing, and is provided with a tamper-resistant second user interface, which can perform a securable operation, on one surface of the housing; and one light transmitting member (transparent member) that is disposed to cover a surface of the first user interface and a surface of the second user interface.

According to the present invention, even in a case in which the secured portion and the non-secured portion exist together, it is possible to provide a settlement terminal device that has robustness (falling impact resistance), and has smooth comfortable operability in a case of moving a finger, the input stylus pen, or the like between the secured portion and the general-purpose portion during the operation in view of the above-described related art situation. Furthermore, a physical connection is generated between the secured portion and the non-secured portion, with the result that an integrated feeling is acquired in appearance, and thus it is possible to provide a settlement terminal device which is excellently designed.

BRIEF DESCRIPTION OF DRAWINGS

FIG. 1A is a front view illustrating a settlement terminal device according to a first embodiment.

FIG. 12B is a side view illustrating the settlement terminal device illustrated in FIG. 12A.

DESCRIPTION OF EMBODIMENTS

Hereinafter, each embodiment of an information processing device will be described with reference to the accompanying drawings. In each embodiment below, a settlement terminal device which is used for a settlement process in product or service transactions will be described as an example of the information processing device according to the present invention.

First Embodiment

Figure 1B:
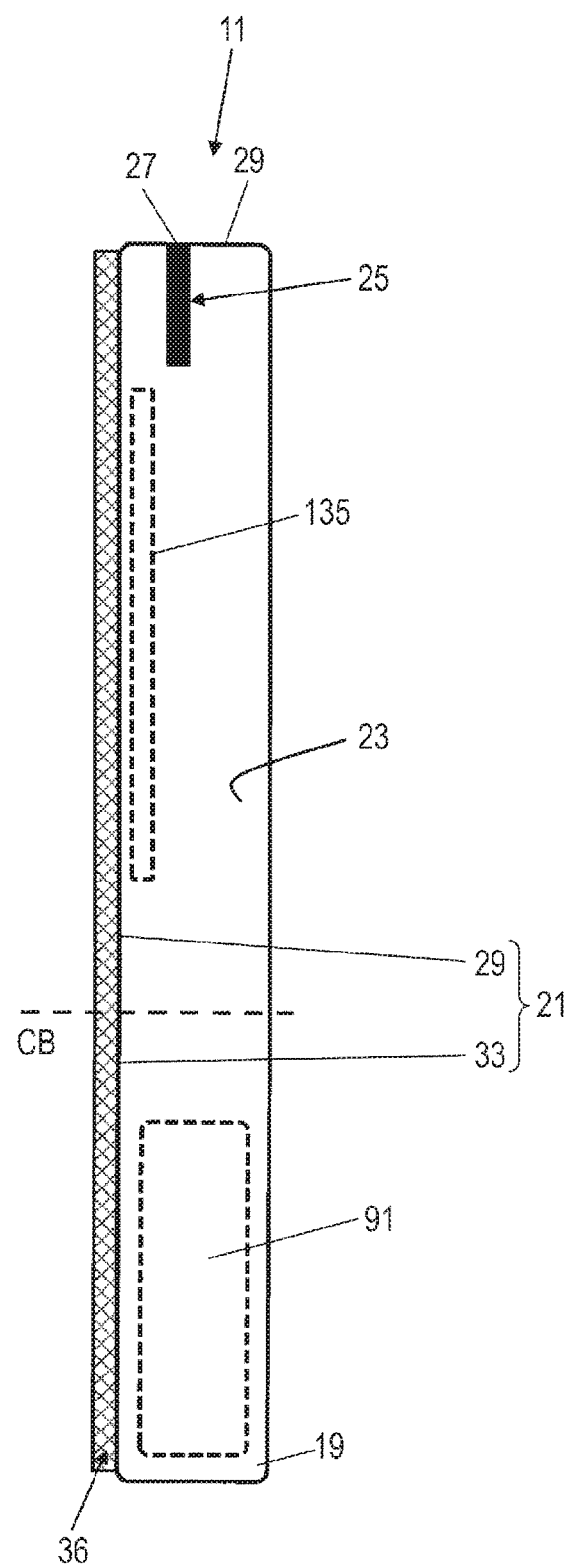
FIG. 1B is a side view illustrating the settlement terminal device according to the first embodiment.
Figure 2:
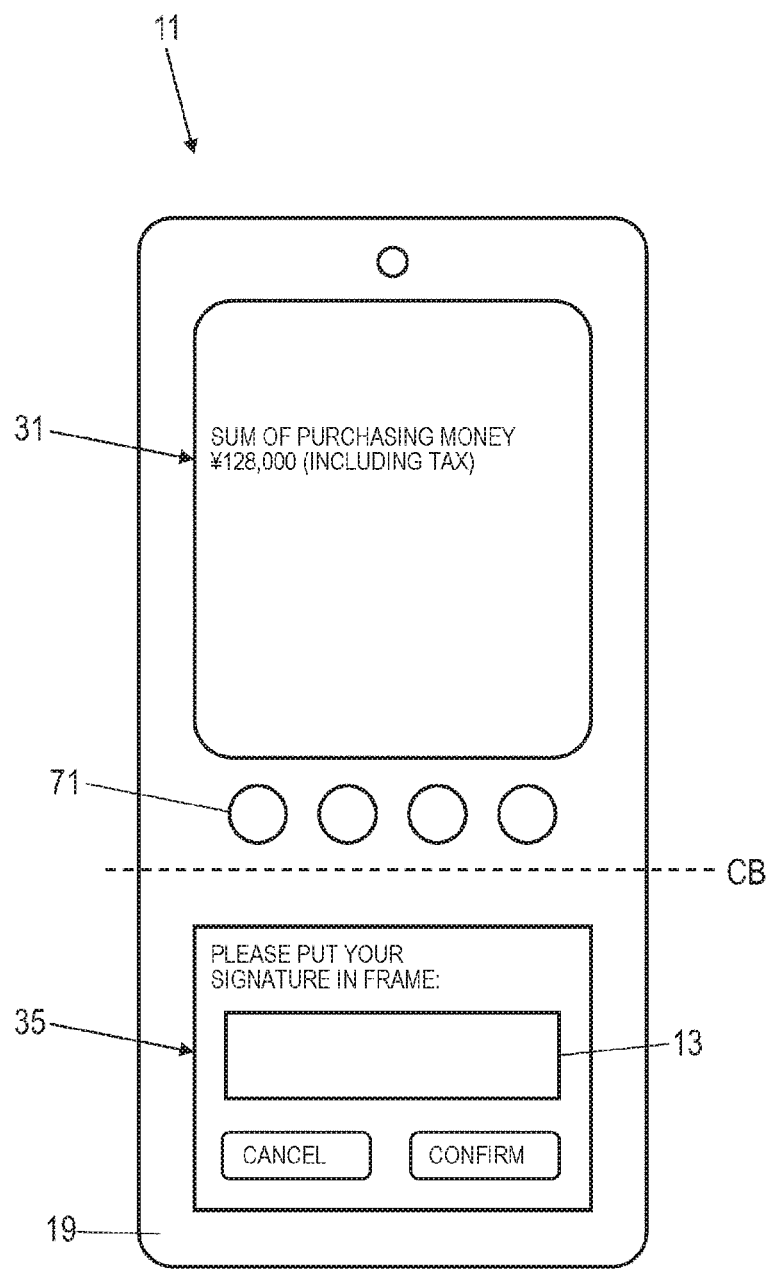
FIG. 2 is a front view illustrating an example of display of a signature input screen in the settlement terminal device according to the first embodiment.
Figure 3:
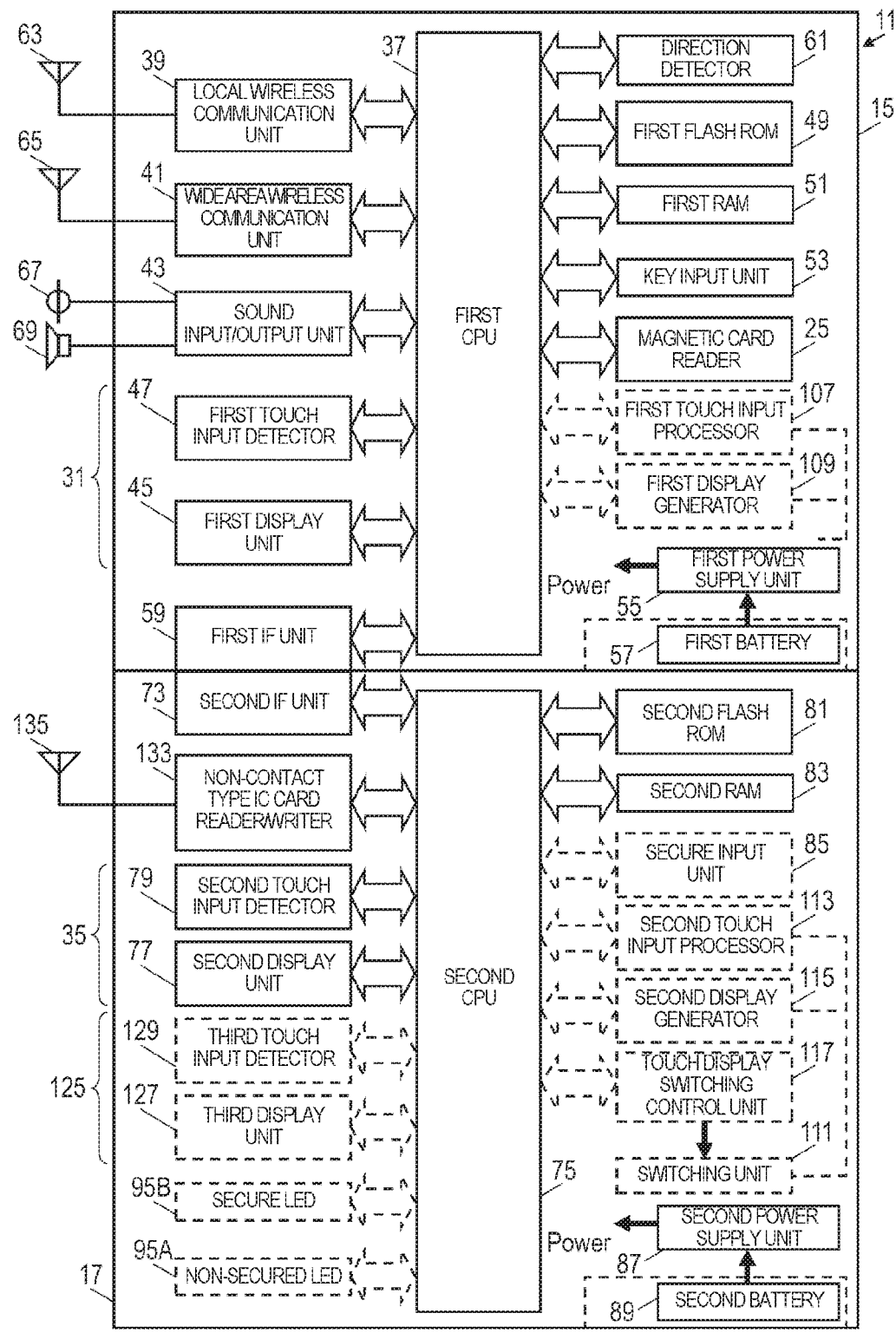
FIG. 3 is a block diagram illustrating an example of a hardware configuration of the settlement terminal device according to the first embodiment.

FIG. 1A is a front view illustrating settlement terminal device 11 according to a first embodiment. FIG. 1B is a side view illustrating settlement terminal device 11 illustrated in FIG. 1A. FIG. 2 is a front view illustrating an example of display of signature input screen 13 in settlement terminal device 11 according to the first embodiment. FIG. 3 is a block diagram illustrating an example of the hardware configuration of settlement terminal device 11 according to the first embodiment.

Settlement terminal device 11 according to the embodiment is portable and includes, for example, first information processor 15 and second information processor 17 that perform various information processes which include a settlement process in product or service transactions.

Settlement terminal device 11 according to the embodiment includes a first user interface (specifically, first touch panel 31) on operation display surface 21 of housing 19. First information processor 15 is placed in housing 19 in which the first user interface is provided. Tamper-resistant secured second information processor 17 is placed in front rather than first information processor 15 of housing 19 which is gripped by an operator. Second information processor 17 includes a second user interface (specifically, second touch panel 35). The second user interface is disposed on operation display surface 21 which is disposed in front rather than the first user interface.

Meanwhile, in each embodiment below, "front" indicates a lower side of housing 19 in a case in which operation display surface 21 is erected in a direction along a vertical line, and a side which is close to the operator in a case in which housing 19 is gripped such that operation display surface 21 is provided along a surface which is approximately perpendicular to the vertical line. Therefore, in settlement terminal device 11 according to the embodiment, in a case in which housing 19 is erected such that the first user interface and the secured second user interface which are placed on operation display surface 21 are arranged in a direction along the vertical line, the second user interface is disposed on the lower side of housing 19 rather than the first user interface. In addition, in settlement terminal device 11 according to the embodiment, the first user interface and the secured second user interface are disposed on operation display surface 21, which is one surface of housing 19, in such a way as to be biased toward end portions which are positioned on opposite sides from each other while interposing the center of housing 19.

Settlement terminal device 11 is portable, and includes first information processor 15 and "secured" second information processor 17. The "secured" means tamper resistant. The "tamper" indicates attacks that attempt to wrongly analyze and change software and hardware inside the information processing device and to wrongly seize, change, and disable information inside the information processing device. Therefore, "tamper resistance" indicates resistance to the attacks. It is possible to, for example, protect information of a customer and to safely perform a transaction in the settlement process with tamper resistance.

First information processor 15 and second information processor 17 may not be separated. In addition, first information processor 15 may be formed to be "secured" or "non-secured". The "non-secured" means non-tamper resistant or low tamper resistance.

In settlement terminal device 11, magnetic card reader 25 is disposed on a side (non-secured side) opposite to the second user interface while interposing the first user interface. Magnetic card reader 25 includes slit 27 on upper side surface 29 of first information processor 15. Slit 27 is a path in which a magnetic card is slid (swiped) and information (magnetic stripe) of the magnetic card is read. Meanwhile, slit 27 may be provided in second information processor 17 instead of being provided in first information processor 15.

Settlement terminal device 11 includes two units, that is, the input unit and the display unit (the first user interface and the second user interface), that is, two touch panels (first touch panel 31 and second touch panel 35). Specifically, first touch panel 31, which is the first user interface, is provided on front surface 29 included in first information processor 15, and second touch panel 35, which is the second user interface, is provided on front surface 33 included in second information processor 17. First touch panel 31 displays, for example, money information as non-secured content, and, further, receives the input of money. In addition, second touch panel 35 displays, for example, a PIN input screen as a secured content, and, further, receives the input of PIN.

A first opening, in which the first user interface, that is, first touch panel 31 is disposed, and a second opening, in which the second user interface, that is, second touch panel 35 is disposed, are formed on operation display surface 21 of housing 19 of settlement terminal device 11. Operation display surface 21 of housing 19 on which the first opening and the second opening are formed, is covered with one piece of light transmitting surface panel (transparent surface panel) 36 (light transmitting member). The first user interface may have only a display function, and the second user interface may have only an input function.

FIG. 2 illustrates an example of display of signature input screen 13 in settlement terminal device 11 according to the embodiment. For example, money information is displayed on first touch panel 31, and, for example, signature input screen 13 is displayed on the second touch panel 35 as the non-secured content, and, further, the signature of an operator (for example, a purchaser, who performs a credit card transaction, of a product) is input.

Settlement terminal device 11 illustrated in FIG. 3 includes first information processor 15 and second information processor 17. First information processor 15 includes first Central Processing Unit (CPU) 37, local wireless communication unit 39, wide area wireless communication unit 41, sound input/output unit 43, first display unit 45, and first touch input detector 47. In addition, first information processor 15 includes first flash Read Only Memory (ROM) 49, first Random Access Memory (RAM) 51, key input unit 53, magnetic card reader 25, first power supply unit 55, first battery 57, and first Interface (IF) 59. In addition, first information processor 15 may further include direction detector 61.

In first information processor 15, each of the units is connected to first CPU 37. First CPU 37 controls overall first information processor 15, and performs, for example, various controls, processes, settings, judgments, determinations, and recognitions.

Local wireless communication unit 39 is connected to local wireless communication antenna 63, and has, for example, a function of performing wireless LAN communication using a local wireless communication path (not illustrated in the drawing). Local wireless communication unit 39 may perform communication (for example, Bluetooth (registered trademark) communication) other than the wireless LAN communication.

Wide area wireless communication unit 41 is connected to wide area wireless communication antenna 65, and has a function of performing communication through a wide area wireless communication path (for example, Wide Area Network (WAN)) which is not illustrated in the drawing. Communication in wide area wireless communication path may be performed using, for example, mobile communication such as Wideband Code Division Multiple Access (W-CDMA), Universal Mobile Telecommunications System (UMTS), Code Division Multiple Access (CDMA) 2000, Long Term Evolution (LTE), and the like.

Sound input/output unit 43 is connected to microphone 67 and speaker 69, and has a function of controlling input and output of sound. For example, sound input/output unit 43, microphone 67, speaker 69, and a wireless telephone line communication unit (not illustrated in the drawing) enable a phone call with another mobile telephone and a fixed telephone. In addition, for example, in a case in which a user (a sales clerk or a customer) operates settlement terminal device 11, speaker 69 is used to issue sounds for alerting the user and warning sounds for indicating operative errors.

First display unit 45 has a function of controlling the display of first touch panel 31. First touch input detector 47 has a function of detecting touch input for first touch panel 31. First touch panel 31, which is the first user interface, is formed in such a way that, for example, pressure sensitive transparent sheet-like first touch input detector 47 is stacked on first display unit 45 (for example, a liquid crystal panel or an organic EL display, and the like).

First flash ROM 49 has a function of storing various data. The stored data may be data relevant to business or may be a program for controlling settlement terminal device 11 (for example, first information processor 15).

First RAM 51 is memory that is used to temporarily store process data, which is generated in the middle of an arithmetic process, in a case of, for example, arithmetic process associated with the operation of settlement terminal device 11 (for example, first information processor 15).

Key input unit 53 has, for example, a function of receiving input from input keys 71 illustrated in FIG. 1A. Magnetic card reader 25 is disposed inside slit 27 in FIG. 1B, and has a function of reading magnetic stripes of the magnetic card.

First power supply unit 55 is mainly the power of first information processor 15, and receives the supply of power from first battery 57 and supplies the power to each of the units (for example, first CPU 37) of first information processor 15. First CPU 37 can supply the power to a part or the whole circuit which is included in first information processor 15 or can stop supplying the power by controlling first power supply unit 55. First CPU 37 may supply the power to second information processor 17 by controlling first power supply unit 55.

First information processor 15 and second information processor 17 are connected to each other through the first interface unit (hereinafter, referred to as "first IF unit 59") and the second interface unit (hereinafter, referred to as "second IF unit 73"), and various data and commands are delivered. First IF unit 59 and second IF unit 73 can be coupled to each other.

Second information processor 17 includes second IF unit 73, second CPU 75, second display unit 77, second touch input detector 79, second flash ROM 81, second RAM 83, secured input unit 85, and second power supply unit 87. Meanwhile, although direction detector 61 is provided in first information processor 15 in the embodiment, direction detector 61 may be provided in second information processor 17 instead.

In second information processor 17, each of the units is connected to second CPU 75. Second CPU 75 controls overall second information processor 17, and performs, for example, various controls, processes (for example, the settlement process), settings, judgments, determinations, recognitions, authentication, and inquires (for example, inquiry about PINs and signatures).

Second display unit 77 has a function of controlling the display of second touch panel 35. Second touch input detector 79 has a function of detecting touch input on second touch panel 35. Second touch panel 35, which is the second user interface, is formed in such a way that, for example, pressure sensitive transparent sheet-like second touch input detector 79 is stacked on the second display unit 77 (for example, a liquid crystal panel, and organic EL display, or the like).

Second flash ROM 81 has a function of storing various data. The stored data may be data relevant to business or may be a program for controlling settlement terminal device 11 (for example, second information processor 17).

Second RAM 83 is memory that is used to temporarily store process data, which is generated in the middle of an arithmetic process, in a case of, for example, arithmetic process associated with the operation of settlement terminal device 11 (for example, second information processor 17).

Secured input unit 85 may include, for example, physical keys or soft keys in order to input PIN. For example, a signature may be input to secured input unit 85. For example, a handwritten PIN may be input to secured input unit 85 using a finger or a stylus pen.

Although secured input unit 85 is not illustrated in FIG. 1A, FIG. 1B, and FIG. 2, secured input unit 85 may be disposed on, for example, the back surface of second information processor 17 in FIG. 1A. The back surface of second information processor 17 is a surface which is positioned on a side opposite to front surface 29 (display surface) on which second touch panel 35 is provided.

Second power supply unit 87 is mainly the power of second information processor 17, and receives the supply of power from second battery 89 and supplies the power to each of the units (for example, second CPU 75) of second information processor 17. Second CPU 75 can supply the power to a part or the whole circuit which is included in second information processor 17 or can stop supplying the power by controlling second power supply unit 87. Second CPU 75 may supply the power to first information processor 15 by controlling second power supply unit 87.

In addition, settlement terminal device 11 includes direction detector 61 that detects the direction of settlement terminal device 11 for gravity. Direction detector 61 is provided in, for example, at least one of first information processor 15 and second information processor 17. Direction detector 61 may include, for example, an acceleration sensor. FIG. 3 illustrates direction detector 61 that is provided in first information processor 15.

In settlement terminal device 11. "secured" or "non-secured" first information processor 15 and "secured" second information processor 17 can be coupled to each other. Input and display of card authentication information (for example, the signature or the PIN information), which is used for settlement, are performed on second touch panel 35 which is included in "secured" second information processor 17. Accordingly, settlement terminal device 11 can input and display the card authentication information which is used for settlement, and can secure "tamper resistance". A "secured" part which requires "tamper resistance" is formed as secured module 91 that is localized in second information processor 17.

Secured module 91 is tamper resistant, thereby preventing non-regular unit from reading confidential data. In order to increase tamper resistance, there are provided a method of increasing confidentiality such that it is difficult to read the confidential data from the outside and a method of providing a mechanism which detects whether or not the physical blocking of secured module 100 is broken. In a case in which secured module 91 detects that the physical cover thereof is broken, secured module 91 may cause reading from the outside to be difficult, or may destroy programs and data which exist inside secured module 91. Secured module 91 can include the both methods. The method of causing reading from the outside to be difficult is realized by encrypting the program and storing software which is decoded and executed in execution as much as necessary. In addition, the method of destroying programs and data with regard to reading from the outside is realized by providing a circuit that safely writes secret information by removing the secret information or overwriting the secret information by a predetermined value, a circuit which causes the secret information to be disabled in a case in which the blocking of secured module 91 is broken, or the like.

In contrast, for example, a plurality of information terminals (for example, a smart phone and a tablet terminal), which are distributed for consumer use, may be used as first information processor 15. For example, a general-purpose (operating system) is used for first information processor 15 as a software platform.

Accordingly, it is easy to reuse and apply the development assets of settlement application software (hereinafter, referred to as a "settlement application") and another application software (hereinafter, referred to as a "business application") which is used for business. In addition, the settlement application and another business application are processed by first information processor 15 that has, for example, high arithmetic processing capability, thereby flexibly operating without stress.

Settlement terminal device 11 starts a settlement procedure by executing the settlement application (not illustrated in the drawing) which is installed in first information processor 15. Settlement terminal device 11 receives settlement-relevant information (for example, money information, payment method, card brand information which is used for settlement) through input to the settlement application or from the outside of settlement terminal device 11.

In a case in which settlement terminal device 11 receives the settlement-relevant information, for example, first CPU 37 and first touch panel 31 perform a process and display for urging an operation of reading a card which is used for settlement, as illustrated in FIG. 1A.

The process and display for urging the operation of reading a card which is used for settlement are performed until when a fact that the card is read is recognized. In a case in which the fact that the card is read is recognized, settlement terminal device 11 performs a card authentication procedure.

A card authentication method is determined based on, for example, the type of a card which is used for settlement, card information, or a contract which is concluded between a member store (credit card member store which treats credit card transactions) which uses settlement terminal device 11 and a settlement center.

In a case of the authentication method according to PIN, settlement terminal device 11 displays the PIN input screen on second touch panel 35 which is disposed on second information processor 17, and acquires the completion of PIN input performed by a card user (for example, a product purchaser in the credit card transactions). The PIN input screen is a screen in which it is possible to input the PIN. The PIN input screen is displayed until when, for example, the completion of PIN input is recognized.

In a case in which the completion of PIN input is recognized, settlement terminal device 11 acquires an inquiry result which indicates whether the input PIN coincides with PIN which is registered in the card used for the settlement or PIN which is registered in the settlement center.

The inquiry about PIN is performed, for example, in the settlement center. Settlement terminal device 11 encodes the input PIN, and transmits the encrypted PIN to the settlement center, together with the card information.

The settlement center decodes the PIN which is received from settlement terminal device 11, and inquires about the decoded PIN and the PIN which is managed in the settlement center. In a case in which it is recognized that the two PINs are matched and the card, which has the card information transmitted together with the PIN, has no problem on the transactions (for example, the card is not on a blacklist), the settlement center manages the credit of settlement terminal device 11.

Settlement terminal device 11 receives credit from the settlement center, performs a sales process as a subsequent settlement process, and ends communication with the settlement center. Settlement terminal device 11 may transmit sales process data to the settlement center until communication with the settlement center ends after the sales process is completed, or may subsequently transmit the sales process data to the settlement center together with the sales process data of another settlement.

In a case in which the two PINs are not matched, the settlement center provides a notification that it is difficult to be credited to settlement terminal device 11. Settlement terminal device 11 receives the notification from the settlement center, and stops settlement without performing the sales process.

In a case of the authentication method according to the PIN, the inquiry about the PIN may be performed between settlement terminal device 11 and a credit card (not illustrated in the drawing) which is read by settlement terminal device 11. If an inquiry result, in which the input PIN coincides with PIN previously recorded in the chip (not illustrated in the drawing) of the credit card, is acquired from the chip in the credit card, settlement terminal device 11 performs the sales process as the subsequent settlement process.

Settlement terminal device 11 may transmit the sales process data to the settlement center immediately after the sales process is completed, that is, before the communication with the settlement center ends, or may subsequently transmit the sales process data together with the sales process data of another settlement. If an inquiry result, in which two PINs do not coincide, is acquired, the sales process is stopped in settlement terminal device 11, and thus the settlement is stopped.

In a case of the authentication method according to signature, settlement terminal device 11 displays signature input screen 13 on second touch panel 35 which is disposed in second information processor 17, and completes the input of the signature by the card user. Signature input screen 13 is, for example, a screen in which it is possible to input the signature as illustrated in FIG. 2. Signature input screen 13 is displayed, for example, until the completion of input of the signature is recognized. If the completion of input of the signature is recognized, settlement terminal device 11 performs the settlement process.

The above-described operational example is performed by cooperation of first information processor 15 and "secured" second information processor 17 which are included in settlement terminal device 11. The settlement application operates in first information processor 15. The display of information relevant to the settlement (for example, money information, a payment method, information of the brand of a card which is used for settlement) or the display for urging an operation of reading the card which is used for settlement may be performed by any one of first information processor 15 and "secured" second information processor 17.

In contrast, the display of the PIN input screen or signature input screen 13 is performed by second touch panel 35 which is disposed in "secured" second information processor 17. The display of the PIN input screen or signature input screen 13 is performed until the input of the PIN or the signature by the card user is completed after the display for urging the operation of reading the card which is used for settlement is performed and the card which is used is read.

As described above, the settlement terminal device 11 can input and display the card authentication information (for example, the signature or the PIN), which is used for the settlement, according to the customer, and can secure "tamper resistance". Settlement terminal device 11 can cause the operator to explicitly recognize a fact that second touch panel 35 is an area in which the safety of input of the authentication information (PIN or the like) is guaranteed. As a result, safe input of the authentication information is possible and a process of securing the input authentication information is realized.

In addition, as described above, a first opening, in which the first user interface, that is, first touch panel 31 is disposed, and a second opening in which the second user interface, that is, second touch panel 35 is disposed are formed on operation display surface 21 of housing 19 of settlement terminal device 11. Furthermore, operation display surface 21, on which the first opening and the second opening are formed, of housing 19 is covered with one piece of light transmitting surface panel 36 (light transmitting member). For example, both first information processor 15, which includes first touch panel 31 having the same input screen size as general-purpose smart phone or tablet terminal, and secured second information processor 17 are placed on thin housing 19. Furthermore, one direction of housing 19 which is perpendicular to the thickness direction is longer than another direction which is perpendicular to the direction and the thickness direction of housing 19. Even though deformation force is added to one direction when the housing drops, the housing is supported in such a way that one light transmitting member reinforces the operation display surface. Therefore, a possibility that housing 19 is damaged due to impact in a case of dropping decreases.

In particular, in operation display surface 21 of housing 19 of settlement terminal device 11 according to the first embodiment, the distance between a peripheral portion of the first opening in which first touch panel 31 is disposed and a peripheral portion of the second opening in which second touch panel 35 is nearly disposed to the side portion and vertical end portions is short. That is, the peripheral portions of the first opening and the second opening are easily damaged due to the drop of settlement terminal device 11. Therefore, since one piece of light transmitting surface panel 36 supports operation display surface 21 in such a way that one light transmitting surface panel 36 reinforces operation display surface 21, a possibility that housing 19 is damaged due to impact in a case of dropping decreases.

Secure dedicated second touch panel 35 is provided in addition to first touch panel 31. It is necessary for the operator to perform input by moving a finger, an input stylus pen, or the like between first touch panel 31 and second touch panel 35, which is a security-guaranteed input area, during the operation of settlement terminal device 11. However, both first touch panel 31 and second touch panel 35 are covered with one light transmitting member. Therefore, the operator can smoothly move a finger, the input stylus pen, or the like while viewing display content on both sides without hanging a finger, the input stylus pen, or the like in a groove or a projection portion which is provided between first touch panel 31 and second touch panel 35.

That is, surface panel 36 is disposed over housing boundary CB between a secured area which includes the placement part of second information processor 17 and a non-secured area which includes the placement part of first information processor 15 on operation display surface 21 of housing 19. The operator can move a finger, the input stylus pen, or the like between the two areas while explicitly recognizing the boundary between the part which includes the security-guaranteed input area and another area in housing 19. In other words, surface panel 36 is disposed over housing boundary CB between a first housing area which includes at least a part of the placement part of first information processor 15 and a second housing area which includes the placement part of second information processor 17 in operation display surface 21 of housing 19. Settlement terminal device 11 can cause the operator to explicitly recognize that second touch panel 35 is the area, in which the security of input of the authentication information (PIN or the like) is guaranteed, by causing the operator to visually recognize housing boundary CB which is disposed near. Furthermore, the operator can move a finger, the input stylus pen, or the like between second touch panel 35 and first touch panel 31 over housing boundary CB during the operation.

Furthermore, in housing 19 of settlement terminal device 11, second touch panel 35 is placed in front rather than first information processor 15 and is provided in front rather than first touch panel 31 of operation display surface 21 when viewed from the operator who inputs the authentication information. With the configuration, second touch panel 35, in which an authentication information input screen such as a PIN PAD or a signature field is displayed, is disposed in a closer position than first touch panel 31 when viewed from the operator who inputs the authentication information. Therefore, according to settlement terminal device 11, comfortable operability is provided according to the operator or the difference in secured input/non-secured input. The operator who inputs the authentication information can input the authentication information while recognizing information which is displayed on first touch panel 31 without being shielded by hand that inputs the authentication information (this will be described in a fifth embodiment which will be described later).

In a case in which input keys 71 are physical keys, openings are provided at parts, in which input keys 71 are disposed, in surface panel 36. The operator of settlement terminal device 11 can press input keys 71. It is preferable that the pressing surface of input keys 71 is the same surface as the external side surface of (surface on a side opposite to a surface which faces housing 19) surface panel 36. Even in a case in which a groove or a projection portion is provided between first touch panel 31 and second touch panel 35 in operation display surface 21 of housing 19, the operator can smoothly move a finger, the input stylus pen, or the like without hanging a finger, the input stylus pen, or the like.

As described above, even in a case in which the secured part and the non-secured part exist together, settlement terminal device 11 according to the first embodiment enables safe input of the authentication information, and realizes the process of securing the input authentication information.

Further, settlement terminal device 11 includes housing 19 which has robustness (falling impact resistance). Furthermore, settlement terminal device 11 can cause a finger, the input stylus pen, or the like to smoothly move between second touch panel 35 of the secured portion (second information processor 17) and first touch panel 31 of the general-purpose portion (first information processor 15) during the operation. That is, settlement terminal device 11 can have comfortable operability. Furthermore, physical connection is generated between the secured portion and the non-secured portion, and thus integrated feeling is acquired in appearance, thereby providing settlement terminal device 11 which is excellently designed.

In settlement terminal device 11 according to the embodiment, secured second information processor 17 can be disposed to be isolated from first information processor 15. Therefore, second information processor 17 can be concentratedly disposed as secured module 91 in a minimum necessary space. Accordingly, it is easy for second information processor 17 to secure tamper resistance (security). In addition, in addition to first touch panel 31, security-dedicated second touch panel 35 is provided, and thus the operator can easily recognize the security-guaranteed input area. As described above, it is possible for settlement terminal device 11 to make the operator know a fact that second touch panel 35 is an area in which the security of input of the authentication information (PIN or the like) is guaranteed. As a result, it is possible to perform safe input of the authentication information, and thus the process of securing the input authentication information is realized. Furthermore, second information processor 17, in which second touch panel 35 is provided, may include housing 19 which has a color (or surface process) which is different from first information processor 15. The color or the surface process of housing 19 may differ in at least a part of housing 19 along the boundary between first information processor 15 and second information processor 17. For example, in operation display surface 21, second information processor 17 and first information processor 15 may be processed with different color (or surface processes) along the boundary between first information processor 15 and second information processor 17, and another part (for example, a rear surface) may be processed with the same color or surface process. In addition, the background color of display in security-dedicated second touch panel 35 may be different from the background color of display in first touch panel 31 which is provided in first information processor 15. Accordingly, it is possible to make the operator know a fact that second touch panel 35 is the area in which the security of input of the authentication information (PIN or the like) is guaranteed.

In addition, in settlement terminal device 11, magnetic card reader 25 is disposed in first information processor 15 which is separated from secured second information processor 17. Accordingly, second information processor 17 can be concentratedly disposed in the minimum necessary space. Therefore, it is easy to physically secure, tamper resistance in second information processor 17. As a result, settlement terminal device 11 can simultaneously realize an easy magnetic card swiping operation for reading while securing high security in which the authentication information, such as the PIN, is securely input.

Second Embodiment

Figure 4A:
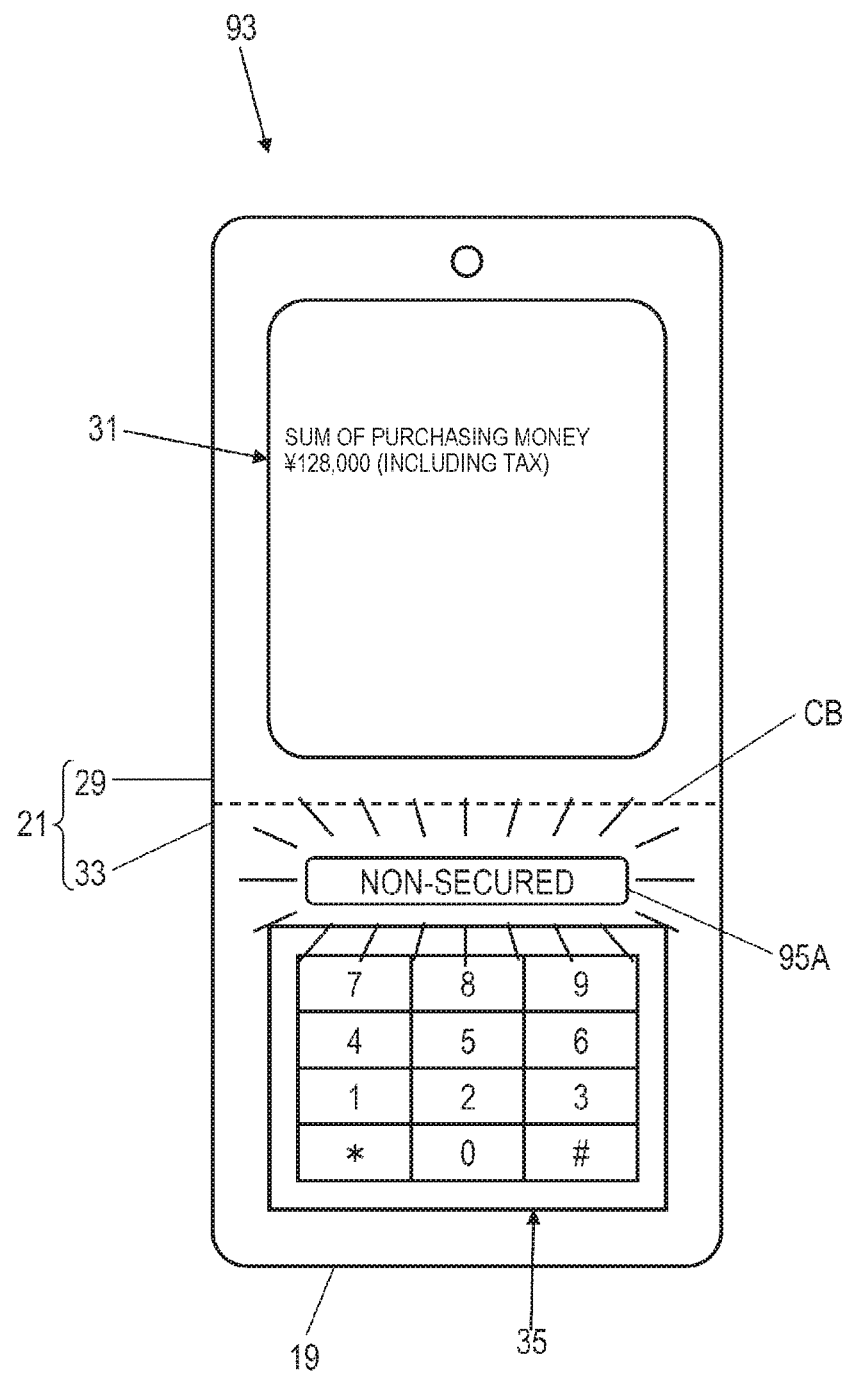
FIG. 4A is a front view illustrating a secured mode of a settlement terminal device according to a second embodiment.
Figure 4B:
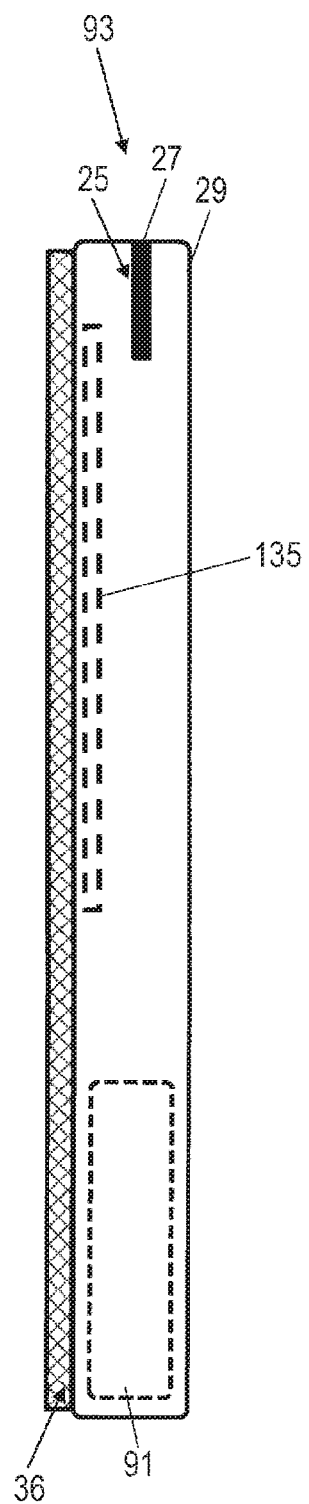
FIG. 4B is a side view illustrating the settlement terminal device illustrated in FIG. 4A.
Figure 5:
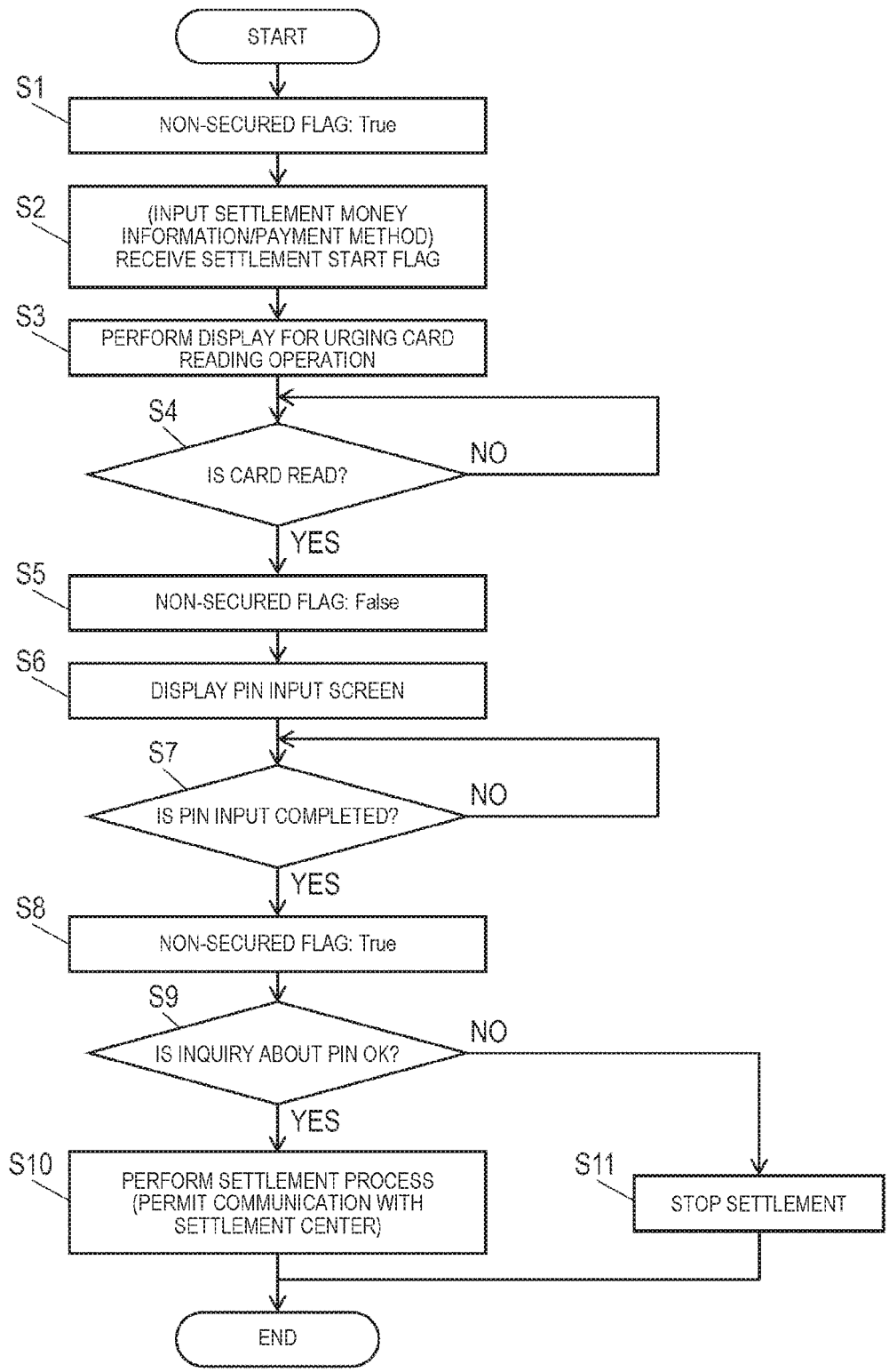
FIG. 5 is a flowchart illustrating a first operation procedure in a case of a settlement process performed by the settlement terminal device according to the second embodiment.

FIG. 4A is a front view illustrating settlement terminal device 93 according to a second embodiment. FIG. 4B is a side view illustrating settlement terminal device 93 illustrated in FIG. 4A. Meanwhile, in each embodiment below, the same reference symbols are attached to the equivalents of members and portions illustrated in FIG. 1A to FIG. 3 and the description thereof will not be repeated. FIG. 5 is a flowchart illustrating an operation procedure in detail in a case of the settlement process performed by settlement terminal device 93 according to the second embodiment.

Settlement terminal device 93 according to the embodiment turns off non-secured display LED (secured state display unit) 95A which indicates that first information processor 15 is in a non-secured mode in a case of, for example, authentication input, and turns on non-secured display LED 95A which indicates that first information processor 15 is in the non-secured mode in other cases of the authentication input. Non-secured LED 95A is disposed on operation display surface 21 between first touch panel 31 and second touch panel 35.

Subsequently, the operation performed in a case of the settlement process performed by settlement terminal device 93A according to the embodiment will be described with reference to FIG. 5. FIG. 5 is a flowchart illustrating an operation procedure in detail in a case of the settlement process performed by settlement terminal device 93A according to the second embodiment. Settlement terminal device 93A starts the procedure of the settlement process by executing a terminal UI settlement application (not illustrated in the drawing) which is installed in second information processor 17. As a premise of the description with reference to FIG. 5, it is assumed that settlement terminal device 93A is in a non-secured mode state. Non-secured LED 95A is in a turned-on state.

In FIG. 5, first, the operating system (not illustrated in the drawing) sets a non-secured flag to "True" in order to indicate that first information processor 15 is in the non-secured mode state (S1). In a case in which the non-secured flag is set to "True", second CPU 75 turns on non-secured LED 95A, that is, "NON-SECURED".

For example, in a case in which the terminal UI settlement application (specifically, first CPU 37) which is installed in first information processor 15 receives inputs of settlement money information and a payment method (S2), the terminal UI settlement application displays a message for urging a card reading operation on first touch panel 31 (S3).

An IC card input/output driver (not illustrated in the drawing) waits until an IC card is read by any one of operations of sliding the IC card into a slit, inserting the IC card into an insertion opening, and approaching settlement terminal device 93 to front surface 29, the operation being performed by a user (S4). In a case in which the IC card is read (S4, YES), the operating system (not illustrated in the drawing) changes the non-secured flag into "False" in order to indicate that first information processor 15 is changed into a secured mode state (S5). In a case in which the non-secured flag is changed into "False", second CPU 75 turns off non-secured LED 95A, that is, "NON-SECURED".

For example, a secured screen UI application (specifically, second CPU 75) which is installed in second information processor 17 instructs first touch panel 31 to display a message for urging the user to input the PIN information and a PIN pad as an example of a software keyboard through second IF unit 73, first IF unit 59, and first CPU 37 (S6).

Second CPU 75 waits until the PIN information is input from second touch panel 35 through second touch input detector 79 (S7).

In a case in which the PIN information is input to second touch input detector 79, the operating system changes the non-secured flag into "True" in order to indicate that first information processor 15 is changed into the non-secured mode state (S8). In a case in which non-secured flag is changed into "True", second CPU 75 turns on non-secured LED 95A, that is, "NON-SECURED". Meanwhile, the turning on and turning off "NON-SECURED" in non-secured LED 95A is controlled by second CPU 75 of secured second information processor 17, that is, under the control of secured execution environment.

In the operation procedure in a case of the settlement process, which requires PIN inquiry and is illustrated in FIG. 5, the PIN information which is input in step S7 may be encrypted by a decodable key of the IC card which is read in step S4. The PIN information, which is input through second touch panel 35 in step S7 may be encrypted. The encrypted PIN information (encrypted PIN information) is output to second CPU 75.

Second CPU 75 hands over the PIN information or the encrypted PIN information to the IC card through a predetermined driver (for example, the IC card input/output driver or the IC card reader driver) which is not illustrated in the drawing.

The IC card inquires about the PIN information acquired by second CPU 75 or data acquired by decoding the encrypted PIN information and PIN information which is registered in the IC card in advance (S9), and outputs a PIN inquiry result. Second CPU 75 inputs the PIN inquiry result, which is output from the IC card through the above-described IC card reader driver and the IC card input/output driver.

If the inquiry result, which indicates that the PIN information input in step S7 coincides with the PIN information registered in the IC card read in step S4, is acquired from the IC card, second CPU 75 instructs the terminal UI settlement application, which is installed in first information processor 15 (specifically, first CPU 37), to perform the sales process as a subsequent settlement process through the operating system (S10).

If the inquiry result, which indicates that the PIN information input in step S7 coincides with the PIN information registered in the IC card read in step S4, is acquired from the IC card in first information processor 15, the terminal UI settlement application (specifically, first CPU 37) performs the sales process as the subsequent settlement. The sales process data, which is acquired after the sales process is performed, is transmitted to the settlement center through the center connection application (specifically, first CPU 37) which is installed in first information processor 15. Meanwhile, the sales process, which is shown in step S10 and is performed on the sales process data, may be executed whenever the customer purchases a product or receives service provision, communication between settlement terminal device 93A and the settlement center may be performed in a predetermined timing (for example, once a week), and may be processed together with other sales process data in a lump in that timing.

In contrast, in a case in which second CPU 75 determines that both pieces of PIN information do not coincide with each other as a result of inquiry about the PIN information in step S9, second CPU 75 causes the secured screen UI application (specifically, second CPU 75), which is installed in second information processor 17, to display a message for causing first touch panel 31 to stop the settlement process (S11). Second CPU 75 does not instruct the terminal UI settlement application (specifically, first CPU 37), which is installed in first information processor 15, to perform the sales process, and the procedure of the subsequent settlement process stops.

In settlement terminal device 93, non-secured display ("NON-SECURED") is turned on or turned off by non-secured LED 95A. Non-secured LED 95A is the secured state display unit that performs non-secured display for indicating a non-tamper resistant non-secured mode. Non-secured LED 95A is disposed on operation display surface 21 between first touch panel 31 and second touch panel 35, and is provided in front, together with secured second touch panel 35, in positions arranged together to be adjacent to each other. As above, settlement terminal device 93 can make the operator know that second touch panel 35 is an area in which the safety of input of the authentication information (PIN or the like) is guaranteed by causing the operator visually recognize non-secured LED 95A disposed near. As a result, the safe input of the authentication information is possible, and the process of securing the input authentication information is realized.

The first user interface, that is, the first opening in which first touch panel 31 is disposed, and the second user interface, that is, the second opening in which second touch panel 35 is disposed are formed on operation display surface 21 of housing 19 of settlement terminal device 93. Furthermore, operation display surface 21 of housing 19, on which the first opening and the second opening are formed, is covered with one piece of light transmitting surface panel 36 (light transmitting member). Surface panel 36 is disposed on operation display surface 21 of housing 19 over housing boundary CB between the secured area which includes the placement part of second information processor 17 and the non-secured area which includes at least a part of the placement part of first information processor 15. In addition, surface panel 36 is disposed on operation display surface 21 of housing 19 over housing boundary CB between the first housing area which includes at least a part of the placement part of first information processor 15 and the second housing area which includes the placement part of second information processor 17. In housing 19 of settlement terminal device 93, second touch panel 35 is placed in front rather than first information processor 15 and provided in front rather than first touch panel 31 of operation display surface 21 when viewed from the operator who inputs the authentication information. This fact is the same as in settlement terminal device 11 according to the first embodiment. Furthermore, surface panel 36 of settlement terminal device 93 according to the second embodiment is disposed on operation display surface 21 of housing 19 over non-secured LED 95A which is the secured state display unit. That is, non-secured LED 95A is covered with one surface panel 36, together with the first user interface and the second user interface.

Settlement terminal device 93 causes the operator to visually recognize the turn-off state of non-secured LED 95A which is disposed near, thereby implicitly indicating that second touch panel 35 is the area in which the safety of input of the authentication information (PIN or the like) is guaranteed. Therefore, the operator can recognize that second touch panel 35 is an area in which safety for inputting the authentication information is guaranteed, and can securely perform safe input of the authentication information on the security-guaranteed input area. Furthermore, the operator can smoothly move between secured second touch panel 35 and non-secured first touch panel 31 while viewing the display content of first touch panel 31 and second touch panel 35. That is, the operator can smoothly move between first touch panel 31 and second touch panel 35 without hanging a finger, the input stylus pen, or the like on a groove, a projection portion, or non-secured LED 95A which are provided between the both sides.

Figure 4C:
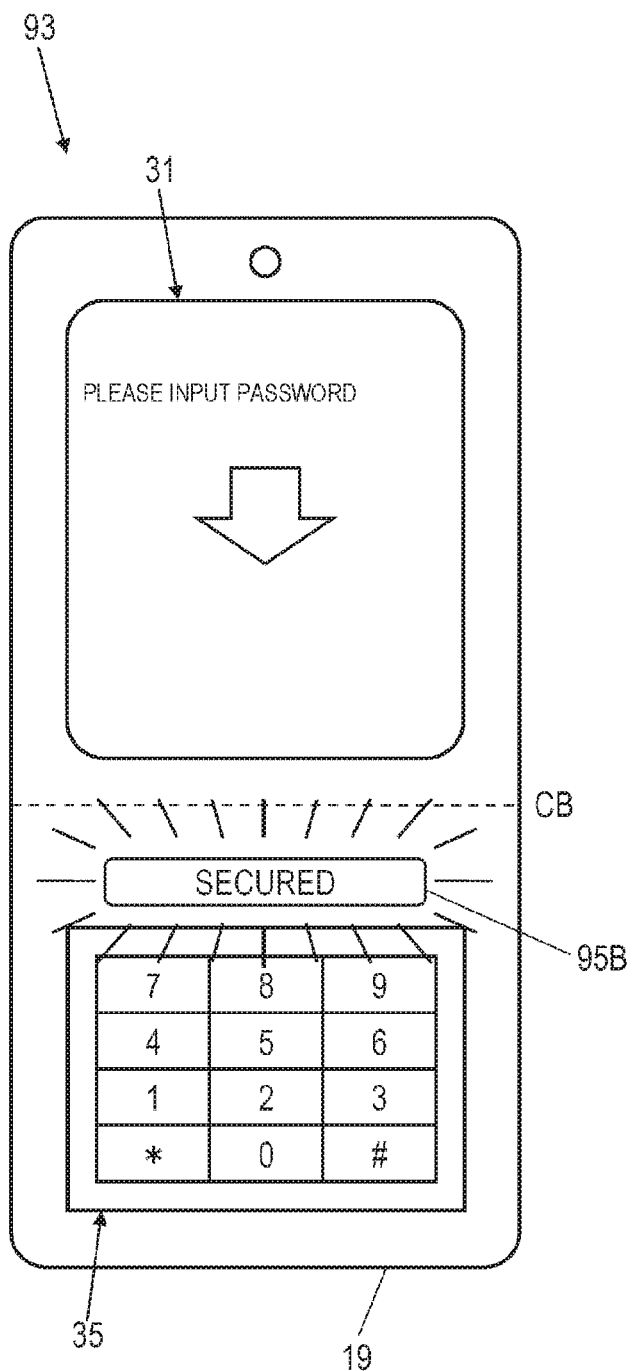
FIG. 4C is a front view illustrating a non-secured mode of the settlement terminal device illustrated in FIG. 4A.
Figure 6:
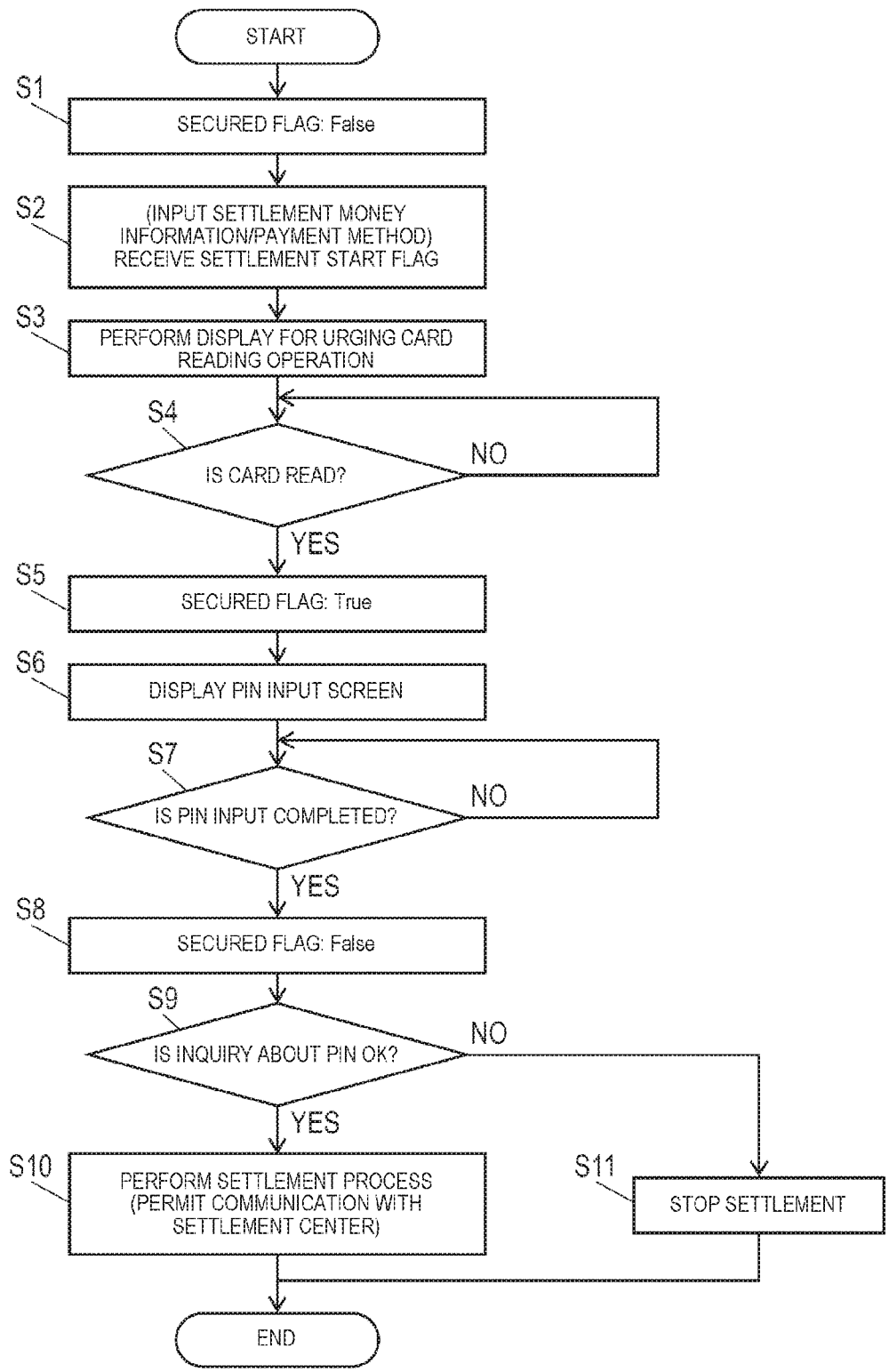
FIG. 6 is a flowchart illustrating a second operation procedure in a case of the settlement process performed by the settlement terminal device according to the second embodiment.

FIG. 4C is a front view illustrating settlement terminal device 93 according to a modification example of the second embodiment. FIG. 6 is a flowchart illustrating an operation procedure in a case of the settlement process performed by settlement terminal device 93 according to the modification example of the second embodiment, in detail. Settlement terminal device 93 starts the procedure of the settlement process by executing the terminal UI settlement application (not illustrated in the drawing) which is installed in second information processor 17. As a premise of the description with reference to FIG. 6, it is assumed that settlement terminal device 93 is in the non-secured mode state. Secured LED 95B is in a turned-off state.

For example, settlement terminal device 93 according to the embodiment turns on secured LED (the secured state display unit) 95B, which indicates that first information processor 15 is in the secured mode, in a case of authentication input, and turns off secured LED 95B, which indicates that first information processor 15 is in the secured mode, in cases other than the authentication. Secured LED 95B is disposed on operation display surface 21 between first touch panel 31 and second touch panel 35.

In FIG. 6, first, the operating system (not illustrated in the drawing) sets a secured flag to "False" in order to indicate that first information processor 15 is in the non-secured mode state (S1). In a case in which the secured flag is set to "False", second CPU 75 causes secured LED 95B, that is, "SECURED" to be a turn-off state. Although "SECURED" (secured LED 95B) in FIG. 4C indicates a turned-on state, "SECURED" is in the turn-off state in step S1.

For example, in a case in which the terminal UI settlement application which is installed in first information processor 15 (specifically, first CPU 37) receives inputs of settlement money information and a payment method (S2), the terminal UI settlement application displays a message for urging a card reading operation on first touch panel 31 (S3).

An IC card input/output driver (not illustrated in the drawing) waits until an IC card is read by any one of operations of sliding the IC card into slit 27, inserting the IC card into an insertion opening, and approaching settlement terminal device 93 to front surface 29, the operating being performed by a user (S4). In a case in which the IC card is read (S4, YES), the operating system (not illustrated in the drawing) changes the secured flag into "True" in order to indicate that first information processor 15 is changed into a secured mode state (S5). In a case in which the secured flag is changed into "True", second CPU 75 turns on secured LED 95B, that is, "SECURED".

For example, a secured screen UI application (specifically, second CPU 75) which is installed in second information processor 17 instructs first touch panel 31 to display a message for urging the user to input the PIN information and a PIN pad as an example of a software keyboard through second IF unit 73, first IF unit 59, and first CPU 37 (S6).

Second CPU 75 waits until the PIN information is input from second touch panel 35 through second touch input detector 79 (S7).

In a case in which the PIN information is input to second touch input detector 79, the operating system changes the secured flag into "False" in order to indicate that first information processor 15 is changed into the non-secured mode state (S8). In a case in which secured flag is changed into "False", second CPU 75 turns off secured LED 95B, that is, "SECURED". Meanwhile, the turning on and turning off "SECURED" in secured LED 95B is controlled by second CPU 75 of secured second information processor 17, that is, under the control of secured execution environment.

The operation procedure subsequent to step S9 in the case of the settlement process performed by settlement terminal device 93 according to the modification example of the second embodiment is the same as the operation procedure subsequent to step S9 in the case of the settlement process performed by settlement terminal device 93 according to the second embodiment.

In the settlement terminal device 93, secured display ("SECURED") is turned on or turned off by secured LED 95B. Secured LED 95B is the secured state display unit that performs secured display which indicates tamper-resistant secured mode. Secured LED 95B is disposed on operation display surface 21 between first touch panel 31 and second touch panel 35, and is provided in front, together with secured second touch panel 35, in positions arranged together to be adjacent to each other. As above, settlement terminal device 93 can make the operator know that second touch panel 35 is an area in which the safety of input of the authentication information (PIN or the like) is guaranteed by causing the operator to visually recognize secured LED 95B disposed near. As a result, the safe input of the authentication information is possible, and the process of securing the input authentication information is realized.

A first opening, in which the first user interface, that is, first touch panel 31 is disposed, and a second opening, in which the second user interface, that is, second touch panel 35 is disposed, are formed on operation display surface 21 of housing 19 of settlement terminal device 93. Furthermore, operation display surface 21 of housing 19, on which the first opening and the second opening are formed, is covered with one piece of light transmitting surface panel 36 (light transmitting member). Surface panel 36 is disposed on operation display surface 21 of housing 19 over housing boundary CB between the secured area which includes the placement part of second information processor 17 and the non-secured area which includes at least a part of the placement part of first information processor 15. In addition, surface panel 36 is disposed on operation display surface 21 of housing 19 over housing boundary CB between the first housing area which includes at least a part of the placement part of first information processor 15 and the second housing area which includes the placement part of second information processor 17. In housing 19 of settlement terminal device 93, second touch panel 35 is placed in front rather than first information processor 15 and is provided in front rather than first touch panel 31 of operation display surface 21 when viewed from the operator who inputs the authentication information. This fact is the same as in settlement terminal device 11 according to the first embodiment.

Furthermore, surface panel 36 of settlement terminal device 93 according to the modification example of the second embodiment is disposed on operation display surface 21 of housing 19 over secured LED 95B. That is, secured LED 95B is covered with one surface panel 36, together with the first user interface and the second user interface.

Settlement terminal device 93 causes the operator to visually recognize the turned-on state of secured LED 95B which is disposed near, thereby explicitly indicating that second touch panel 35 is the area in which the safety of input of the authentication information (PIN or the like) is guaranteed. Therefore, the operator can recognize that second touch panel 35 is the area in which safety for inputting the authentication information is guaranteed, and can securely perform safe input of the authentication information on the security-guaranteed input area. Furthermore, the operator can smoothly move between secured second touch panel 35 and non-secured first touch panel 31 while viewing the display content of first touch panel 31 and second touch panel 35. That is, the operator can smoothly move between first touch panel 31 and second touch panel 35 without hanging a finger, the input stylus pen, or the like on a groove, a projection portion, or secured LED 95B which is provided between the both sides.

Furthermore, in either settlement terminal device 93 of FIG. 4A or settlement terminal device 93 of FIG. 4C, the side of second information processor 17, in which second touch panel 35 is provided, of housing 19 may have a color (and surface process) which is different from the side of first information processor 15. Specifically, the color (or the surface process) of housing 19 of settlement terminal device 93 may differ along housing boundary CB between first touch panel 31 and non-secured LED 95A (FIG. 4A) or secured LED 95B (FIG. 4B). The color or surface process of housing 19 may differ in at least a part of housing 19 along the boundary between first information processor 15 and second information processor 17. For example, second information processor 17 and first information processor 15 may be processed with different colors or surface processes along the boundary between first information processor 15 and second information processor 17 on operation display surface 21, and second information processor 17 and first information processor 15 may be processed with the same color or surface process in other parts (for example, rear surface). Otherwise, the background color of display in security-dedicated second touch panel 35 may be different from the background color of display in first touch panel 31. Accordingly, it is possible to make the operator know a fact that second touch panel 35 is the area in which the security of input of the authentication information (PIN or the like) is guaranteed.

Third Embodiment

Figure 7A:
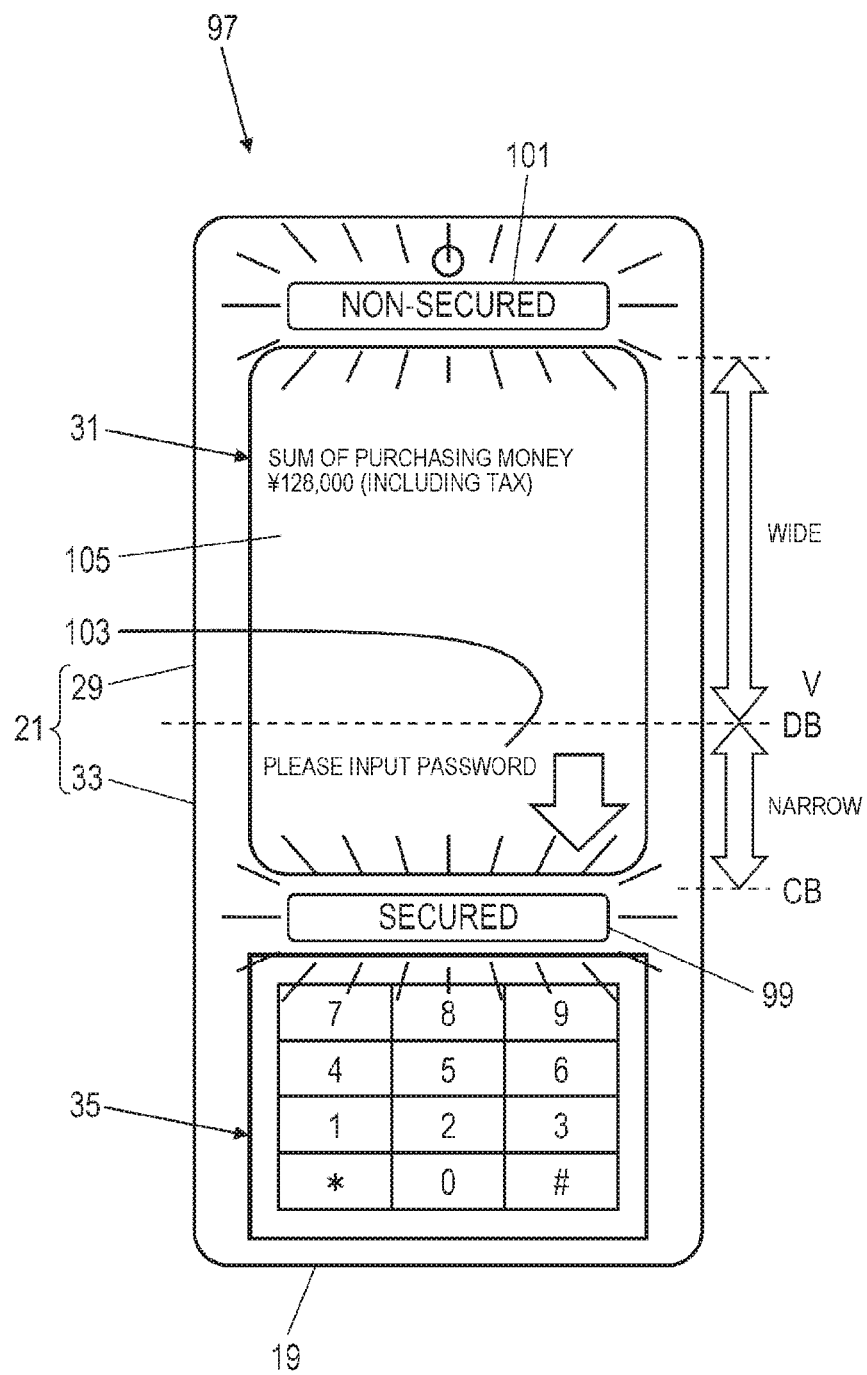
FIG. 7A is a front view illustrating a settlement terminal device according to a third embodiment.
Figure 7B:
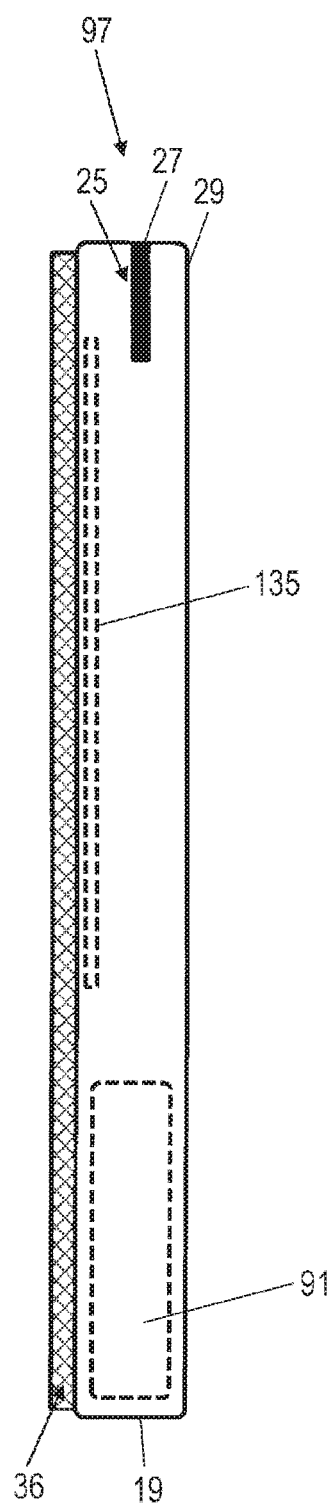
FIG. 7B is a side view illustrating the settlement terminal device illustrated in FIG. 7A.

FIG. 7A is a front view illustrating settlement terminal device 97 according to a third embodiment. FIG. 7B is a side view illustrating settlement terminal device 97 illustrated in FIG. 7A. In settlement terminal device 97 according to the embodiment, secured LED (the secured state display unit) 99 is disposed as an example of a secured notification unit that performs a secured notification (for example, display and turning on), which indicates that first information processor 15 is in the secured mode, between first touch panel 31 and second touch panel 35. In addition, in settlement terminal device 97 according to the embodiment, non-secured LED (the secured state display unit) 101 is disposed as an example of a non-secured notification unit, which performs a non-secured notification (for example, display or turning on) indicating that first information processor 15 is in the non-secured mode, on a side opposite to secured LED 99 while interposing first touch panel 31 therebetween. Furthermore, surface panel 36 is disposed on operation display surface 21 of housing 19 over the secured notification unit.

In addition, in settlement terminal device 97, secured display area 103 is displayed on a display surface of first touch panel 31 on a side adjacent to second touch panel 35. In secured display area 103, for example, "Please input password." or the like is displayed. In first touch panel 31, a display area other than secured display area 103 forms non-secured display area 105. Setting is performed such that non-secured display area 105 is wider than secured display area 103.

Figure 8:
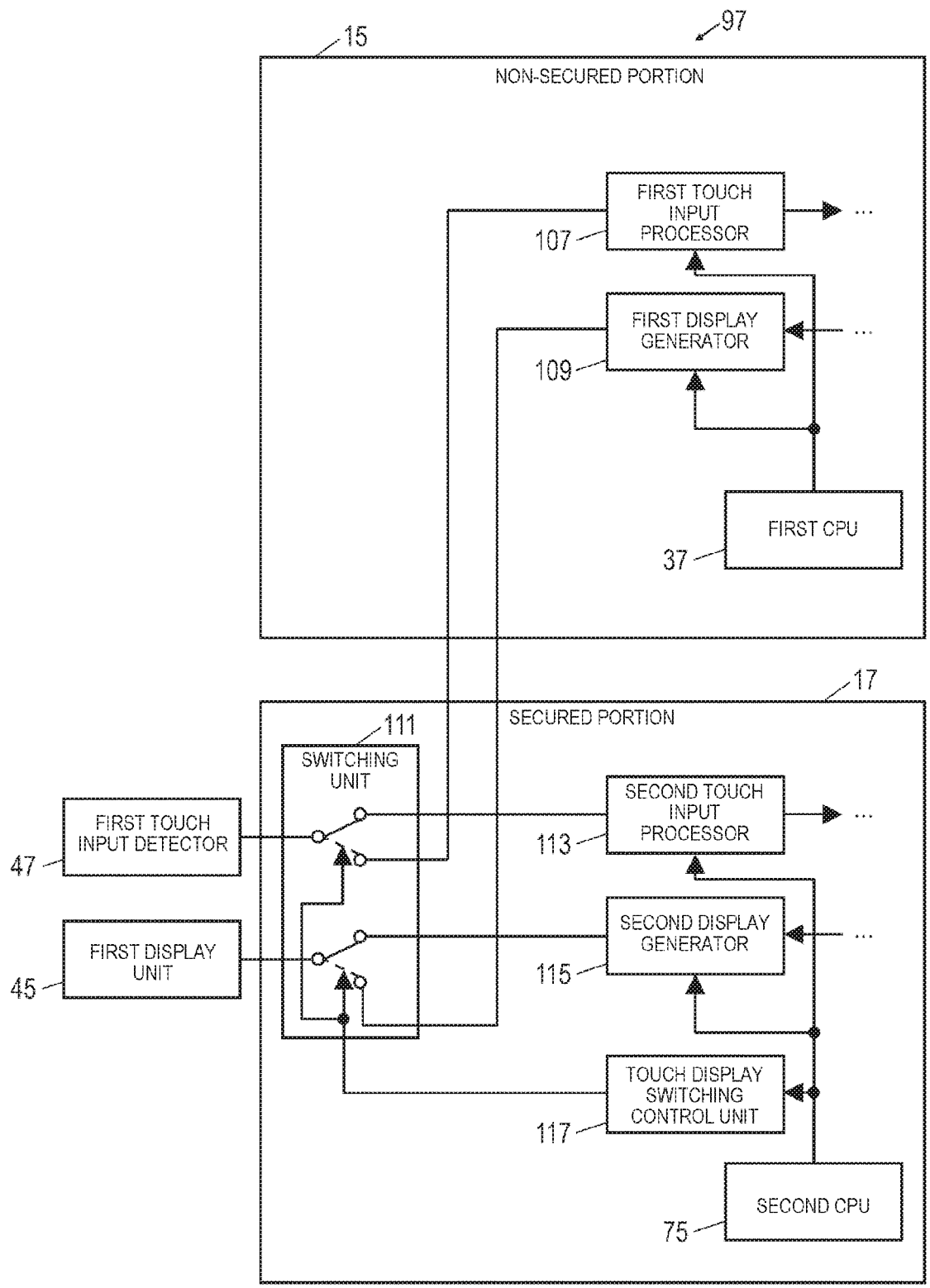
FIG. 8 is a block diagram illustrating an example of a hardware configuration in which display is divided and controlled.

FIG. 8 is a block diagram illustrating an example of a hardware configuration in which display is divided and controlled. Settlement terminal device 97 is formed in such a way that first information processor 15 illustrated in FIG. 3 further includes first touch input processor 107 and first display generator 109 and second information processor 17 illustrated in FIG. 3 further includes switching unit 111, second touch input processor 113, second display generator 115, and touch display switching control unit 117.

First touch input processor 107 acquires an input value of first touch input detector 47, which is input in non-secured display area 105 of first touch panel 31. First display generator 109 generates display data (for example, "sum of purchasing money") in non-secured display area 105 using first CPU 37 based on the input value which is acquired by first touch input detector 47. Furthermore, first display generator 109 generates display data (for example, "Please input password") in secured display area 103 using second CPU 75, and receives input of PIN from first touch input detector 47. In a case in which the operator starts input of the PIN, settlement terminal device 97 may display marks, such as asterisks (*), corresponding to the number according to the number of input PINs in secured display area 103 of first touch panel 31 in order to indicates a PIN input situation.

Switching unit 111 switches and connects first touch input detector 47 and first display unit 45 to first touch input processor 107 and first display generator 109 or to second touch input processor 113 and second display generator 115 according to a display area switching instruction from touch display switching control unit 117.

Second touch input processor 113 acquires the input value of first touch input detector 47, which is input in secured display area 103 of first touch panel 31. Second display generator 115 generates display data in secured display area 103 using second CPU 75 based on the input value which is acquired by first touch input detector 47.

Touch display switching control unit 117 transmits a display area switching instruction to switching unit 111 according to an instruction from second CPU 75. Therefore, first touch panel 31 is usually grasped by display control rights (prompt controlled) by touch display switching control unit 117 of secured second information processor 17. That is, settlement terminal device 97 is formed such that secured second information processor 17 usually manages the display control rights on first touch panel 31.

Returning to FIG. 7A, a first opening in which the first user interface, that is, first touch panel 31 is disposed is formed on operation display surface 21 of housing 19 of settlement terminal device 97. Furthermore, a second opening in which the second user interface, that is, second touch panel 35 is disposed is formed on operation display surface 21. Operation display surface 21 of housing 19, on which first opening and second opening are formed, is covered with one piece of light transmitting surface panel 36 (light transmitting member). Surface panel 36 is disposed on operation display surface 21 of housing 19 over housing boundary CB between the secured area which includes the placement part of second information processor 17 and the non-secured area which includes at least a part of the placement part of first information processor 15. In addition, surface panel 36 is disposed on operation display surface 21 of housing 19 over housing boundary CB between the first housing area which includes at least a part of the placement part of first information processor 15 and the second housing area which includes the placement part of second information processor 17. In housing 19 of settlement terminal device 97, second touch panel 35 is placed in front rather than first information processor 15 and is provided in front rather than first touch panel 31 of operation display surface 21 when viewed from the operator who inputs the authentication information. This fact is the same as in settlement terminal device 11 according to the first embodiment.

In settlement terminal device 97, non-secured LED 101, which is provided in settlement terminal device 93 according to the second embodiment, is provided on a side opposite to secured LED 99 while interposing first touch panel 31. Non-secured LED 101 is the secured state display unit which performs non-secured display indicating of non-tamper resistant non-secured mode.

Settlement terminal device 97 explicitly indicates that safety of input of the authentication information (PIN or the like) for first touch panel 31 is in a non-guaranteed area by causing the operator to visually recognize the turned-on state of non-secured LED 101. The operator can recognize that safety of input of the authentication information for first touch panel 31 is in the non-guaranteed area, thereby avoiding input of the authentication information for first touch panel 31. In addition, settlement terminal device 97 explicitly indicates the operator that safety of input of the authentication information (PIN or the like) is not guaranteed in non-secured mode by causing the operator to visually recognize the turned-on state of non-secured LED 101. The operator can recognize that safety of input of the authentication information (PIN or the like) is not guaranteed in non-secured mode, thereby avoiding input of the authentication information.

Furthermore, in the settlement terminal device 97, second touch panel 35 and secured LED 99 are provided in front positions in a state of being arranged together to be adjacent to each other, similarly to settlement terminal device 93 according to the modification example of the second embodiment. Secured LED 99 is the secured state display unit that performs secured display of indicating tamper-resistant secured mode, and is disposed on operation display surface 21 between first touch panel 31 and second touch panel 35. Furthermore, surface panel 36 of settlement terminal device 97 according to the third embodiment is disposed on operation display surface 21 of housing 19 over secured LED 99, similarly to settlement terminal device 93 according to the modification example of the second embodiment. That is, secured LED 99 is covered with one surface panel 36, together with first touch panel 31 and second touch panel 35.

Furthermore, in settlement terminal device 97, secured display area 103, in which secured content is displayed in the secured mode, is provided in first touch panel 31 on a side close to second touch panel 35. Furthermore, surface panel 36 is disposed over display boundary DB between secured display area 103 of the display surface of first touch panel 31 and non-secured display area 105 (another display area). Settlement terminal device 97 causes the operator to visually recognize the display of urging the operator to input the authentication information (PIN or the like) and the display of indicating the position of the security-guaranteed input area, in secured display area 103 of first touch panel 31. Specifically, in secured display area 103, for example, "please input password" or the like is displayed. Settlement terminal device 97 can increase visibility of display indicating that second touch panel 35 is in the secured mode using a part of a wide display area included in non-secured first touch panel 31. Therefore, the operator can smoothly move a finger, the input stylus pen, or the like between the two areas while viewing the boundary between a part which includes the security-guaranteed display area and another area in the first user interface.

Therefore, the operator can smoothly move while viewing both display content without hanging a finger, the input stylus pen, or the like on a groove, a projection portion, or secured LED 99 which is provided between first touch panel 31 and second touch panel 35. In addition, comfortable operability is provided to settlement terminal device 97 according to the operator or difference in secured input/non-secured input. The operator who inputs the authentication information can input the authentication information while checking information, which is displayed on first touch panel 31, in particular, secured display area 103, without being shielded by hand or the like for inputting the authentication information. As described above, display for urging the operator to input the authentication information, such as a password and a signature, and marks, such as asterisks (*), corresponding to the number according to the number of input PINs are displayed in secured display area 103. The operator can input the authentication information while checking the display without being shielded by hand or the like for inputting the authentication information.

In addition, since second touch panel 35 and secured LED 99 are separately disposed from first touch panel 31 and non-secured LED 101 in positions, the operator can easily recognize that the security of the input area is guaranteed, and it is possible to safely input the authentication information. That is, the operator can easily recognize that second touch panel 35 is the security-guaranteed input area. Furthermore, the operator can recognize that an area on a side which is closer to second touch panel 35 and secured LED 99 than display boundary DB in first touch panel 31 is a security-guaranteed display area in the secured mode.

The background color of display in security-dedicated second touch panel 35 may be different from the background color of display in non-secured display area 105 of first touch panel 31. The background color of display in secured display area 103 of first touch panel 31 and the background color of display in security-dedicated second touch panel 35 may be the same color or a similar color. Furthermore, the background color of display in secured display area 103 of first touch panel 31 may be different from the background color of display in non-secured display area 105 of first touch panel 31. Settlement terminal device 97 can further cause the operator to explicitly recognize the boundary between a part which includes the security-guaranteed input area and another area in first touch panel 31.

Furthermore, the color (and surface process) of housing 19 of settlement terminal device 97 may differ along the broken line between non-secured display area 105 of first touch panel 31 and secured display area 103. The color or surface process of housing 19 may differ along the boundary between first information processor 15 and second information processor 17 in at least a part of housing 19. For example, in operation display surface 21, different colors or surface processes may be performed on second information processor 17 and first information processor 15 along the boundary between first information processor 15 and second information processor 17, and the same color or surface process is performed at other parts (for example, rear surface). Otherwise, in operation display surface 21, display boundary DB between secured display area 103 and non-secured display area 105 and housing boundary CB between the first housing area which includes at least a part of the placement part of first information processor 15 and the second housing area which includes the placement part of second information processor 17 may be disposed in parallel or in different positions in a direction in which first touch panel 31 and second touch panel 35 are arranged. Furthermore, in addition to housing boundary CB, a groove or a linear projection portion for indicating the boundary may be provided at a portion of housing 19 on an extended line of display boundary DB between non-secured display area 105 of first touch panel 31 and secured display area 103. In this manner, it is possible to make the operator know that secured display area 103 of first touch panel 31 and second touch panel 35 are areas in which the safety of display or input of authentication information (PIN or the like) is guaranteed.

That is, compared to a disposition in which one secured state display unit (non-secured LED 95A or secured LED 95B) exists between first touch panel 31 and second touch panel 35, non-secured and secured areas are clearly distinguished. As above, settlement terminal device 97 can make the operator to know the area in which the safety of input of the authentication information is guaranteed, and can securely process the input authentication information. Furthermore, the scope of non-secured display area 105 of first touch panel 31 is widely secured, compared to the scope (length and width) of secured display area 103 of second touch panel 35, and thus it is possible to increase the flexibility and diversity of display from the application in first touch panel 31.

In settlement terminal device 97, switching display area 103A may be provided, instead of the above-described secured display area 103, on a side close to second touch panel 35 of first touch panel 31. Switching display area 103A is an area in which secured content is displayed in the secured mode and non-secured content is displayed in the non-secured mode. Furthermore, similarly to above, non-secured content is displayed in either the secured mode or the non-secured mode in non-secured display area 105. In the non-secured mode, switching display area 103A and non-secured display area 105 are used together, and thus first touch panel 31 is used the most by the general-purpose application. Therefore, the operability of the general-purpose application and the visibility of the display are increased in settlement terminal device 97. Furthermore, the secured level of an undefined-secured level area between a secured/non-secured boundary in housing 19 and a secured display/non-secured display boundary between first touch panel 31 and second touch panel 35 changes according to an operation mode. The undefined-secured level area is switching display area 103A of first touch panel 31 according to the third embodiment. It is possible for the settlement terminal device to cause the operator to visually recognize the undefined-secured level area.

The color or surface process of housing 19 or the background display color of the touch panel may differ along the boundary on housing 19, which is on the extension of the boundary between switching display area 103A of first touch panel 31 and non-secured display area 105, in addition to the boundary between first information processor 15 and second information processor 17. Settlement terminal device 97 can cause the operator to further explicitly recognize the boundary of a part, which includes the security-guaranteed area of first touch panel 31, and an area other than the part in each of the secured mode/the non-secured mode. In addition, the background display color of switching display area 103A of first touch panel 31 may be the same as that of the second touch panel in the secured mode, and may be the same as that of non-secured display area 105 of first touch panel 31 in the non-secured mode. The operator can grasp each of the secured levels of non-secured display area 105 and switching display area 103A of first touch panel 31, and second touch panel 35 provided in second information processor 17 according to the operation mode.

Figure 9A:
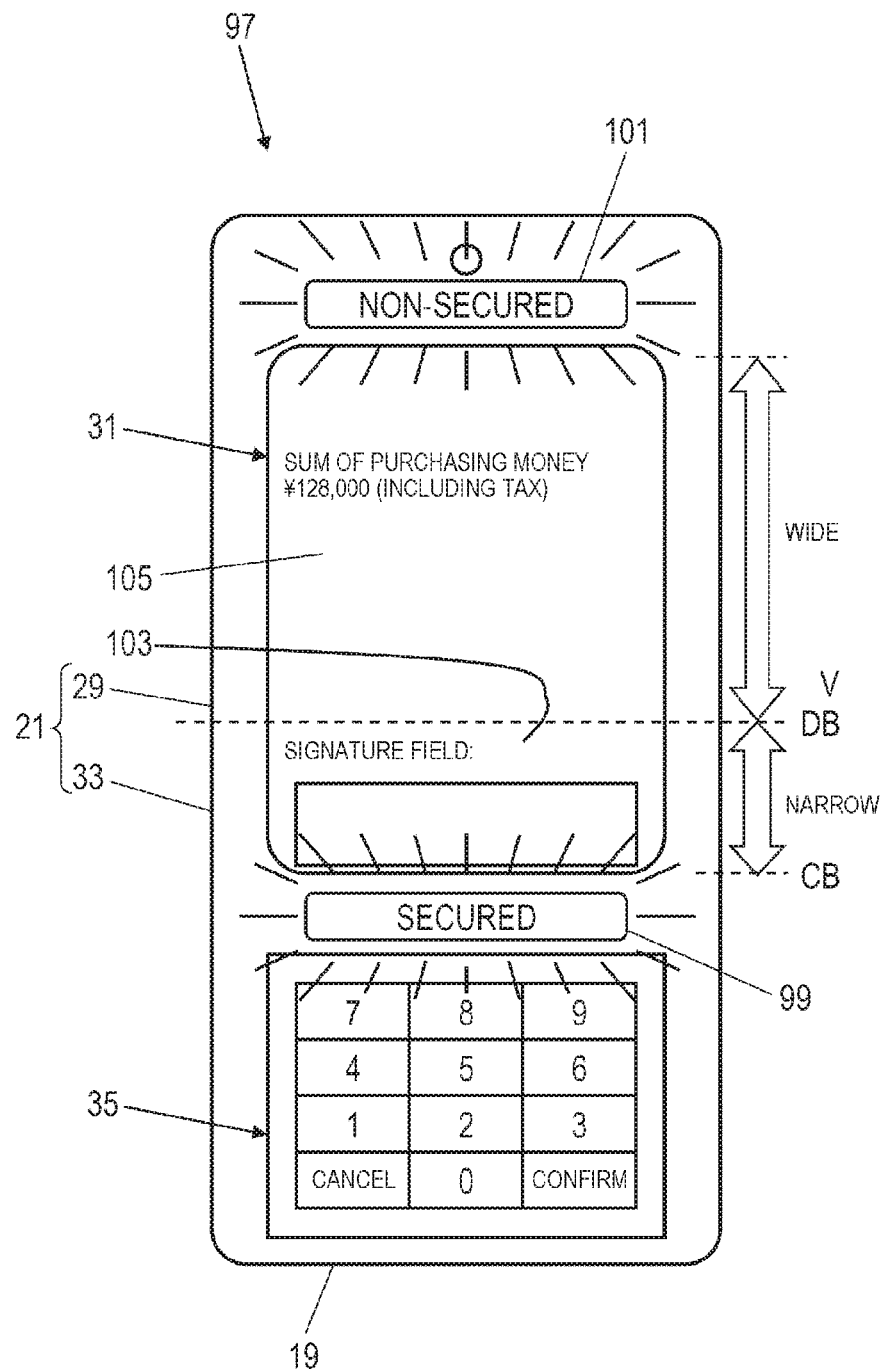
FIG. 9A is a front view illustrating the settlement terminal device according to the third embodiment.
Figure 9B:
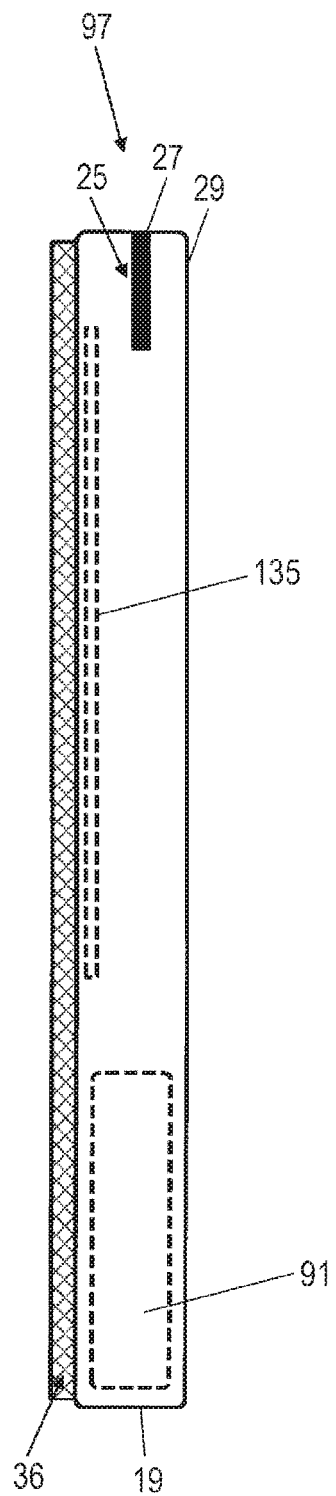
FIG. 9B is a side view illustrating the settlement terminal device illustrated in FIG. 9A.

In secured display area 103 or switching display area 103A, which is the security-guaranteed display area of first touch panel 31 described with reference to FIG. 7A and FIG. 7B hereinabove, for example, a signature field may be displayed in order to input signature as the authentication information, as illustrated in FIG. 9A. Secured display area 103 or switching display area 103A in FIG. 9A is a security-guaranteed display input area in the secured mode for input as well as display. FIG. 9B is a side view illustrating settlement terminal device 97 illustrated in FIG. 9A.

Figure 10A:
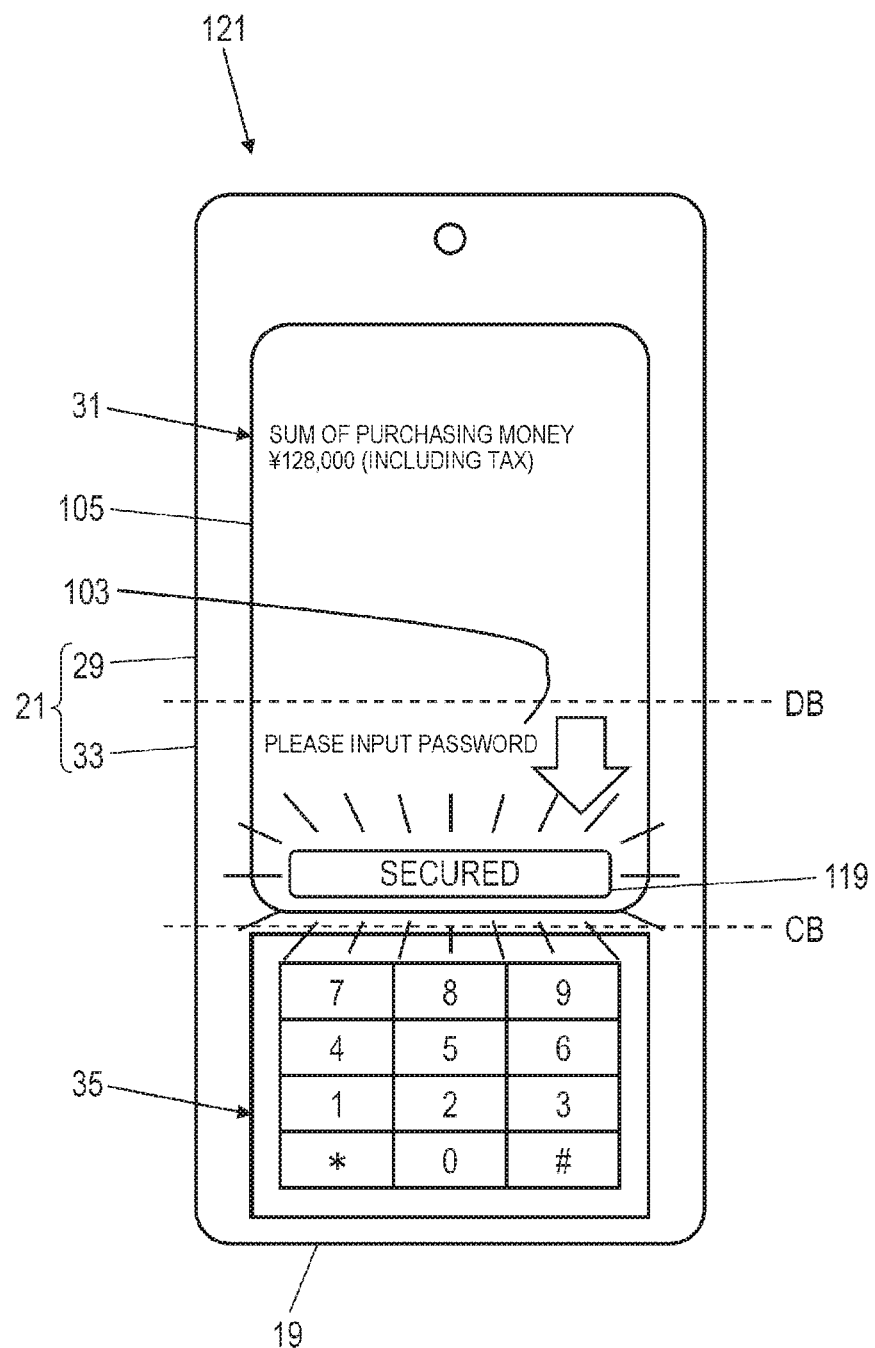
FIG. 10A is a front view illustrating the settlement terminal device, in which a secured state display area is displayed on a display surface, according to a modification example of the third embodiment.
Figure 10B:
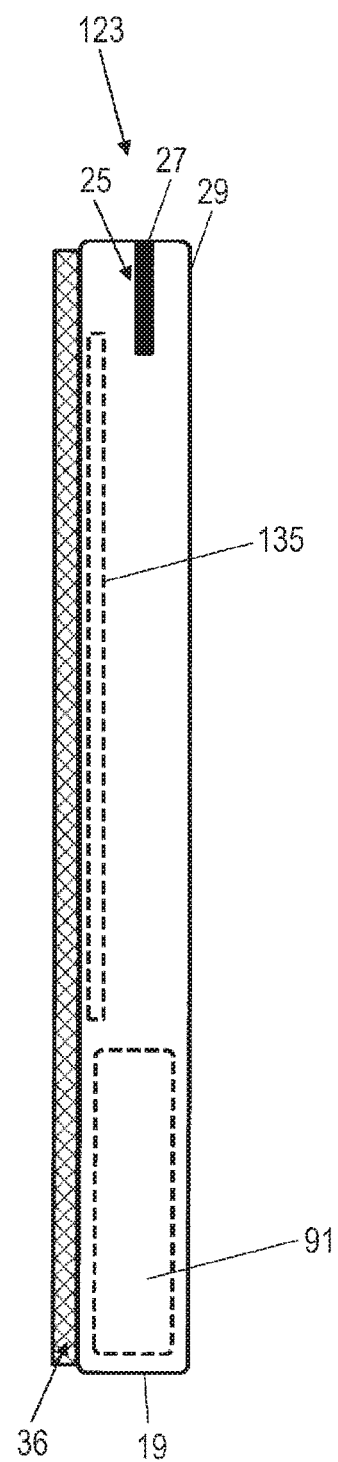
FIG. 10B is a side view illustrating the settlement terminal device illustrated in FIG. 10A.

FIG. 10A is a front view illustrating settlement terminal device 121 according to a modification example of the third embodiment in which secured state display area 119 is displayed on the display surface. FIG. 10B is a side view illustrating settlement terminal device 121 illustrated in FIG. 10A. Hereinafter, description will be performed based on parts which are different from the third embodiment. The other parts are the same as in the third embodiment.

Settlement terminal device 121 displays secured display area 103 on a display surface close to second touch panel 35 of first touch panel 31, and secured state display area 119 which switches and displays secured display (SECURED) indicative of the secured mode or non-secured display (NON-SECURED) indicative of the non-secured mode. Settlement terminal device 121 may display or non-display the secured display (SECURED) indicative of the secured mode or display or non-display the non-secured display (NON-SECURED) indicative of the non-secured mode in secured state display area 119. Surface panel 36 is disposed over the display boundary between secured display area 103 on the display surface of second touch panel 35 and first touch panel 31 and non-secured display area 105.

In settlement terminal device 121, secured display area 103 and secured state display area 119 are displayed on the display surface of first touch panel 31 on a side of second touch panel 35. That is, in settlement terminal device 121, secured state display area 119, on which at least any one of the secured display indicative of the tamper-resistant secured mode and the non-secured display indicative of the non-tamper resistant non-secured mode is displayed in first touch panel 31, is displayed in secured display area 103 which exists on a side close to second touch panel 35. Specifically, for example, content for urging to input the authentication information, such as "please input password" is displayed in secured display area 103. In secured state display area 119, for example, "SECURED" is displayed. Second CPU 75 of second information processor 17 is formed to usually grasp (prompt control) display control rights for first touch panel 31.

Therefore, secured or non-secured display is performed on the display surface on a side close to second touch panel 35 of first touch panel 31. At least any of secured display (SECURED) in a case of the secured mode and non-secured display (NON-SECURED) in a case of the non-secured mode is necessarily displayed. As a result, a secured or non-secured dedicated display unit (secured LED 99 or non-secured LED 101) is not necessary, and thus it is possible to simplify a structure for secured or non-secured display. Furthermore, in settlement terminal device 121, it is possible to increase the screen size of first touch panel 31 or second touch panel 35 in a case of the same-sized operation display surface 21, compared to settlement terminal device 97 according to the third embodiment. Therefore, in settlement terminal device 121, it is possible to further provide comfortable operability/visibility. Since secured display and non-secured display are switched and displayed at the same spot, unnecessary time, such as movement of gaze in a case in which the operator grasps the secured state of settlement terminal device 121 can be reduced.

In settlement terminal device 121, content for urging to input the authentication information and secured display may be alternately performed on a part of display surface on a side close to second touch panel 35 in the display surface of first touch panel 31. Settlement terminal device 121 can display the content for urging to input the authentication information and the secured display in large, respectively, and thus visibility is further improved in a case in which the operator performs settlement. Otherwise, settlement terminal device 121 can display the content for urging to input the authentication information and the secured display in a small area, respectively, and thus the operability of the operator is further improved.

Fourth Embodiment

Figure 11A:
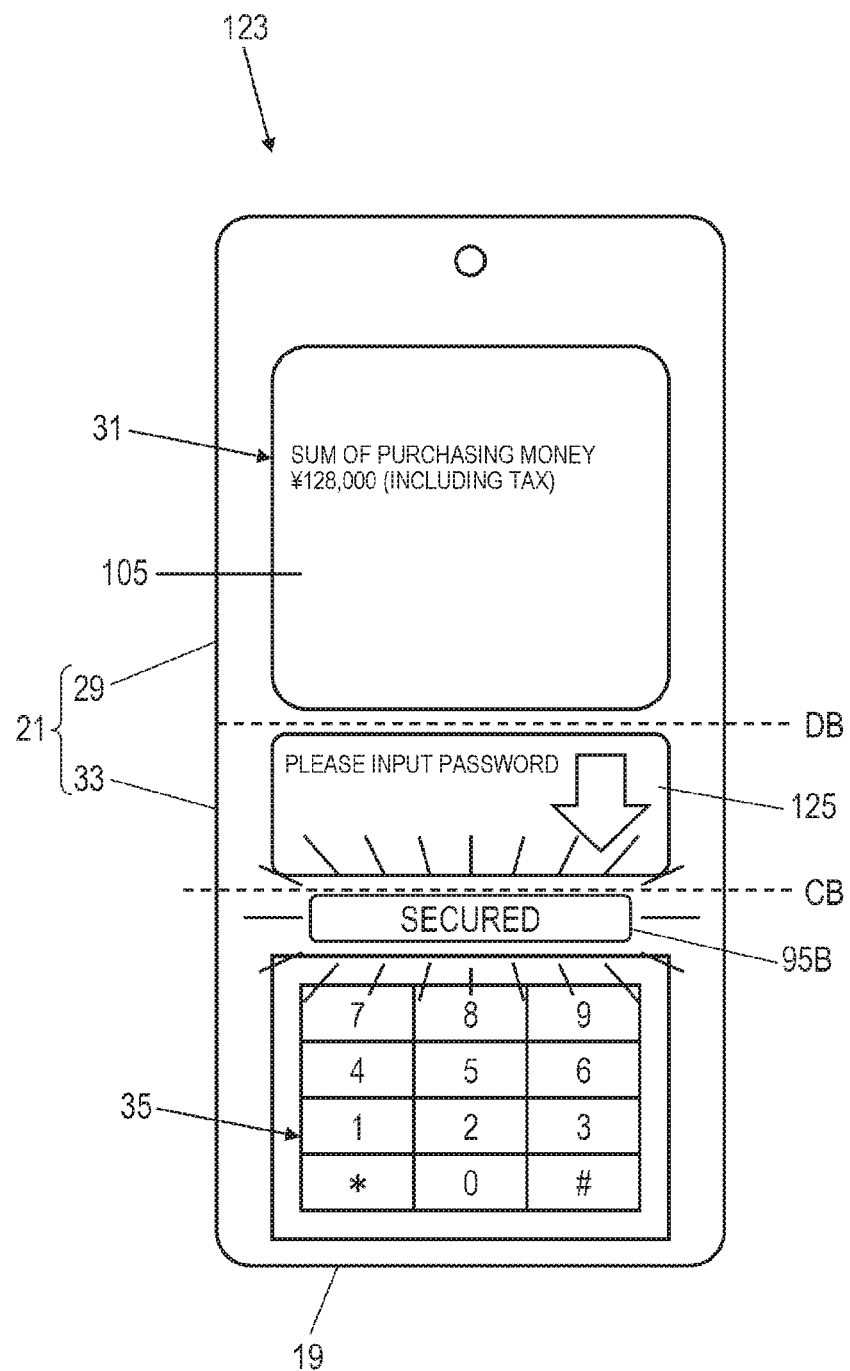
FIG. 11A is a front view illustrating a settlement terminal device, in which a third user interface is provided, according to a fourth embodiment.
Figure 11B:
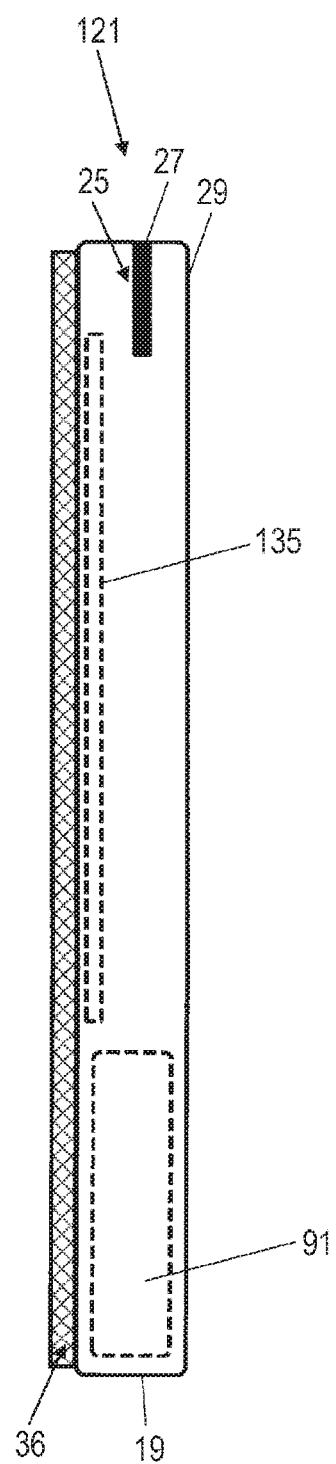
FIG. 11B is a side view illustrating the settlement terminal device illustrated in FIG. 11A.

FIG. 11A is a front view illustrating settlement terminal device 123, in which a third user interface is provided, according to a fourth embodiment. FIG. 11B is a side view illustrating settlement terminal device 123 illustrated in FIG. 11A.

A first opening in which the first user interface, that is, first touch panel 31 is disposed and a second opening in which the second user interface, that is, second touch panel 35 is disposed are formed on operation display surface 21 of housing 19 of Settlement terminal device 123. Furthermore, operation display surface 21 of housing 19, on which the first opening and the second opening are formed, is covered with one piece of light transmitting surface panel 36 (light transmitting member). Surface panel 36 is disposed on operation display surface 21 of housing 19 over housing boundary CB between the secured area which includes the placement part of second information processor 17 and the non-secured area which includes at least a part of the placement part of first information processor 15. In addition, surface panel 36 is disposed on operation display surface 21 of housing 19 over housing boundary CB between the first housing area which includes at least a part of the placement part of first information processor 15 and the second housing area which includes the placement part of second information processor 17. In housing 19 of settlement terminal device 123, second touch panel 35 is placed in front rather than first information processor 15 and is provided in front rather than first touch panel 31 of operation display surface 21 when viewed from the operator who inputs the authentication information. This fact is the same as in settlement terminal device 11 according to the first embodiment.

In settlement terminal device 123 according to the embodiment, third touch panel 125, which is a third input display unit having secured display area 103, is disposed between first touch panel 31 and second touch panel 35. Furthermore, surface panel 36 is further disposed over third touch panel 125. Third touch panel 125 includes third display unit 127 and third touch input detector 129. Third display unit 127 has a function of controlling the display of third touch panel 125. Third touch input detector 129 has a function of detecting touch input to third touch panel 125.

In settlement terminal device 123, second touch panel 35 and third touch panel 125 are provided in front positions arranged together to be adjacent to each other. Second touch panel 35 and third touch panel 125 are disposed in positions separated from non-secured first touch panel 31. As above, in settlement terminal device 123, second touch panel 35 and the third user interface are grouped and separated from first touch panel 31. Therefore, it is possible to make the operator further clearly know that second touch panel 35 is the area in which the safety of input of the authentication information (PIN or the like) is guaranteed. As a result, the safe input of the authentication information is possible, and the process of securing the input authentication information is realized. In addition, since the distinguishment between the non-secured area and the secured area becomes easier, it is possible to widely secure non-secured display area 105 of first touch panel 31 compared to the scope (length and width) of secured display area 103 of second touch panel 35. Therefore, it is possible to increase the flexibility and diversity of display from the application in first touch panel 31.

Furthermore, the background color of display in third touch panel 125 may be different from the background color of display in first touch panel 31. Furthermore, the background color of display in security-dedicated second touch panel 35 may also be different from the background color of display in first touch panel 31. Furthermore, the background color of display in third touch panel 125 and the background color of display in security-dedicated second touch panel 35 may be the same color or a similar color. Furthermore, the color (and surface process) of housing 19 of settlement terminal device 123 may differ along housing boundary CB between first touch panel 31 and third touch panel 125. The color or surface process of housing 19 may differ in at least a part of housing 19 along the boundary between first information processor 15 and second information processor 17. For example, on operation display surface 21, second information processor 17 and first information processor 15 may be processed with colors or surface processes which are different from each other along the boundary between first information processor 15 and second information processor 17, and second information processor 17 and first information processor 15 may be processed with the same color or surface process at the other parts (for example, rear surface). Furthermore, a groove or a linear projection portion for indicating the boundary may be provided at a portion on housing 19 on an extended line of housing boundary CB between first touch panel 31 and third touch panel 125. With this, it is possible to make the operator know that second touch panel 35 and third touch panel 125 are areas in which the display/input safety of the authentication information (PIN or the like) is guaranteed.

In addition, settlement terminal device 123 further may set third touch panel 125 to the switching display area, in which the secured content is displayed in the secured mode and the non-secured content is displayed in the non-secured mode, without setting third touch panel 125 to the security-dedicated display area. In the non-secured mode, first touch panel 31 and third touch panel 125 are used the most by the general-purpose application. Therefore, the operability of the general-purpose application and the visibility of display are improved in settlement terminal device 123. Furthermore, in the secured mode, second touch panel 35 and third touch panel 125 are used together. Therefore, in a case in which the authentication information is input in settlement terminal device 123, the operability thereof and the visibility of display are improved. Furthermore, the secured level of the undefined-secured level area between the secured/non-secured boundary in housing 19 and the boundary between third touch panel 125 and non-secured display-dedicated first touch panel 31 changes according to the operation mode. The undefined-secured level area is third touch panel 125 in the fourth embodiment. It is possible for the settlement terminal device to cause the operator to visually recognize that the undefined-secured level area is third touch panel 125.

The color or surface process of housing 19 or the background display color of the touch panel may differ along the boundary between second touch panel 35 and third touch panel 125 in addition to the boundary between first information processor 15 and second information processor 17 (that is, first touch panel 31 and third touch panel 125). In addition, the background display color of third touch panel 125 may be the same as that of the second touch panel in the secured mode and may be the same as that of first touch panel 31 in the non-secured mode. Settlement terminal device 123 can make the operator to further explicitly recognize the boundary between a part which includes the security-guaranteed input display area and the other area in each of the secured mode/non-secured mode. The operator can grasp each of the secured levels of non-secured display area 105 of first touch panel 31, third touch panel 125 which is the switching display area, and second touch panel 35 which is provided in second information processor 17 according to the operation mode.

Furthermore, a housing boundary may be provided between second touch panel 35 and third touch panel 125, and the color (and the surface process) of housing 19 of settlement terminal device 123 may differ along the housing boundary. The color or surface process of housing 19 may differ in at least a part of housing 19 along the boundary between first information processor 15 and second information processor 17. For example, on operation display surface 21, second information processor 17 and first information processor 15 may be processed with colors or surface processes which are different from each other along the boundary between first information processor 15 and second information processor 17, and second information processor 17 and first information processor 15 may be processed with the same color or surface process at the other parts (for example, rear surface). Furthermore, a display boundary may be provided between first touch panel 31 and third touch panel 125, and a groove or a linear projection portion for indicating the display boundary may be provided at a portion on housing 19 on an extended line of the display boundary in addition to the housing boundary. With this, it is possible to make the operator know that third touch panel 125 is an area in which the display/input safety of the authentication information (PIN or the like) is guaranteed in the secured mode.

Figure 12A:
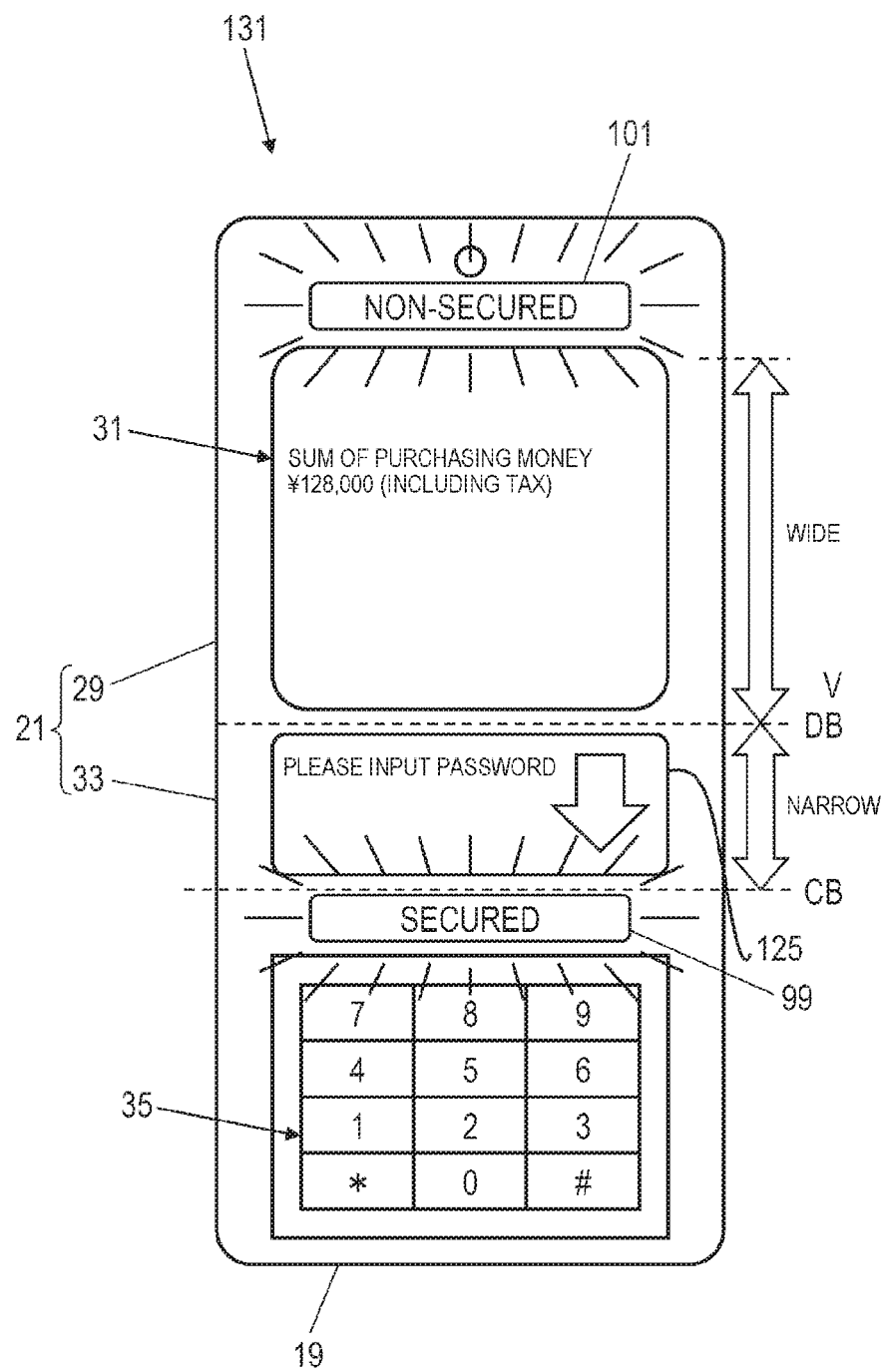
FIG. 12A is a front view illustrating a settlement terminal device, in which a secured LED and a non-secured LED are provided, according to a modification example of the fourth embodiment.

FIG. 12A is a front view illustrating settlement terminal device 131 in which secured LED 99 and non-secured LED 101 are provided according to a modification example of the fourth embodiment. FIG. 12B is a side view illustrating settlement terminal device 131 illustrated in FIG. 12A. Hereinafter, description will be performed based on parts which are different from the fourth embodiment. The other parts are the same as in the fourth embodiment.

Settlement terminal device 131 according to the modification example further includes secured LED (the secured state display unit) 99 and non-secured LED (the secured state display unit) 101 in addition to third touch panel 125. Furthermore, surface panel 36 is disposed on operation display surface 21 of housing 19 over the secured state display unit.

According to settlement terminal device 131, second touch panel 35 and secured LED 99 are provided in front positions arranged together to be adjacent to each other. Second touch panel 35 and secured LED 99 are disposed in positions separated from first touch panel 31 and non-secured LED 101, with the result that the operator can easily recognize that the security of the input area is guaranteed, and thus it is possible to safely input the authentication information. That is, the distinguishment between non-secured and secured areas becomes further clear.

Therefore, the operator can smoothly move while visually recognizing the display content of each touch panel without hanging a finger, the input stylus pen, or the like on a groove, a projection portion or secured LED 99 provided between first touch panel 31 and third touch panel 125. In addition, according to settlement terminal device 131, comfortable operability is provided according to the operator or the difference in secured input/non-secured input. The operator who inputs the authentication information can input the authentication information while checking information which is displayed on first touch panel 31 and third touch panel 125 without being shielded by hand or the like for inputting the authentication information. As described above, display for urging the operator to input the authentication information, such as a password and a signature, and marks, such as asterisks (*), corresponding to the number according to the number of input PINs are displayed in third touch panel 125. The operator can input the authentication information while checking the display without being shielded by hand or the like for inputting the authentication information.

In addition, since second touch panel 35 and secured LED 99 are disposed in positions separated from first touch panel 31 and non-secured LED 101, the operator can easily recognize that the security of the input area is guaranteed, and thus it is possible to safely input the authentication information. That is, the operator can easily recognize that second touch panel 35 and third touch panel 125 are security-guaranteed input areas in at least secured mode.

Settlement terminal device 123 or 131 may be formed such that secured state display area (that is, display of "SECURED" and "NON-SECURED") is displayed in third touch panel 125 instead of that secured LED 99 and non-secured LED 101 are installed. In third touch panel 125, for example, content for urging to input the authentication information, such as "please input password", is displayed together with secured state display. Second CPU 75 of second information processor 17 is formed to usually grasp (prompt control) the display control rights on third touch panel 125.

Therefore, secured or non-secured display is performed on third touch panel 125. At least any of secured display (SECURED) in a case of the secured mode and non-secured display (NON-SECURED) in a case of the non-secured mode is necessarily displayed. As a result, secured or non-secured dedicated display unit (secured LED 99 or non-secured LED 101) is not necessary, and thus it is possible to simplify a structure for secured or non-secured display. Furthermore, in settlement terminal device 123 or 131, it is possible to increase the screen size of first touch panel 31, second touch panel 35, or third touch panel 125 in a case of the same-sized operation display surface 21. Therefore, in settlement terminal device 123 or 131, it is possible to further provide comfortable operability/visibility. Since secured display and non-secured display are switched and displayed at the same spot, unnecessary time, such as movement of gaze in a case in which the operator grasps the secured state of settlement terminal device 123 or 131 can be reduced.

Settlement terminal device 123 or 131, content for urging to input the authentication information and secured display may be alternately performed on third touch panel 125. Settlement terminal device 123 or 131 can display the content for urging to input the authentication information and the secured display in large, respectively, and thus visibility is further improved in a case in which the operator performs settlement. Otherwise, settlement terminal device 123 or 131 can display the content for urging to input the authentication information and the secured display in a small area, respectively, and thus the operability of the operator is further improved.

Figure 13A:
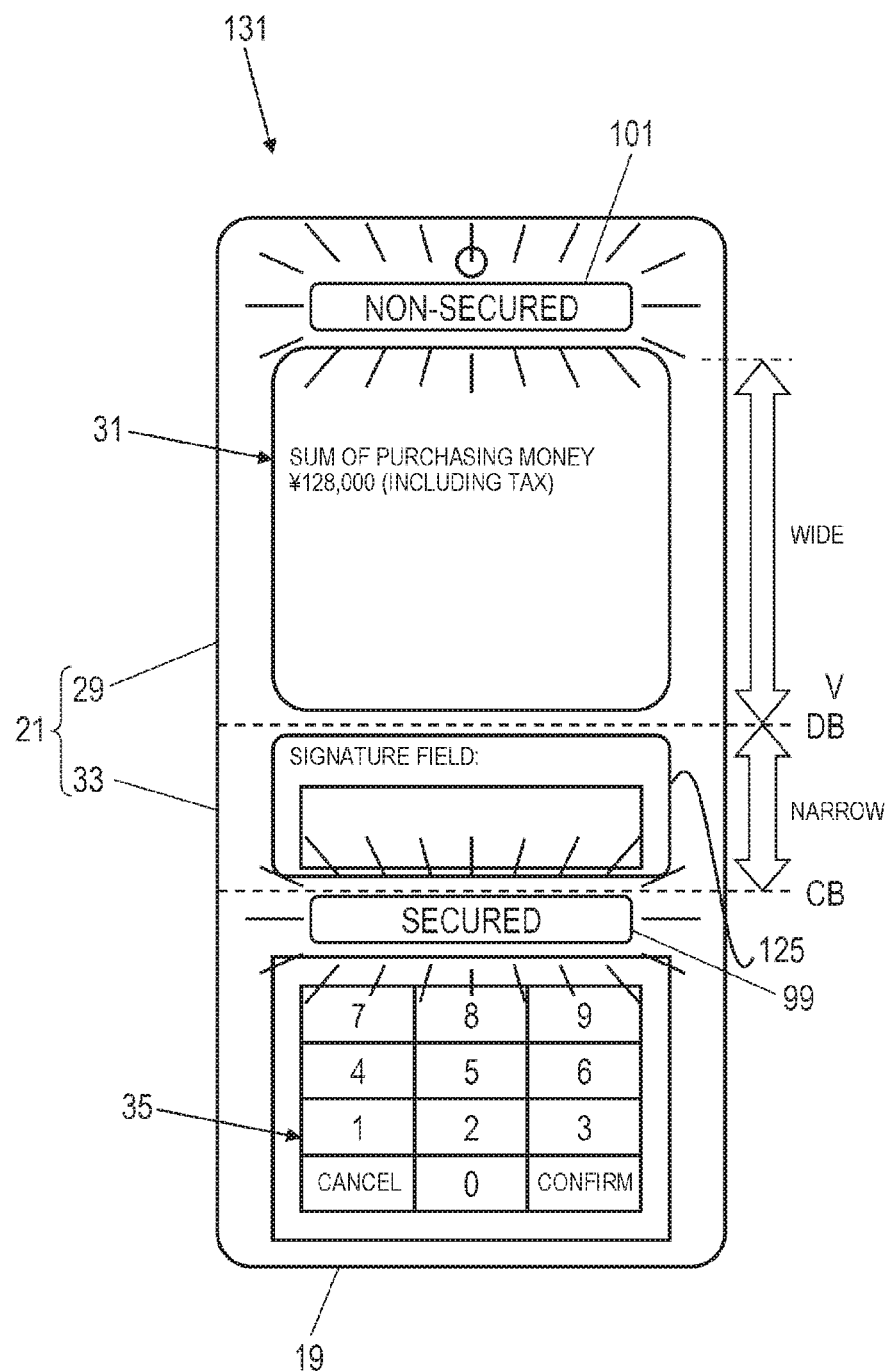
FIG. 13A is a front view illustrating the settlement terminal device, in which a third user interface is provided, according to the fourth embodiment.
Figure 13B:
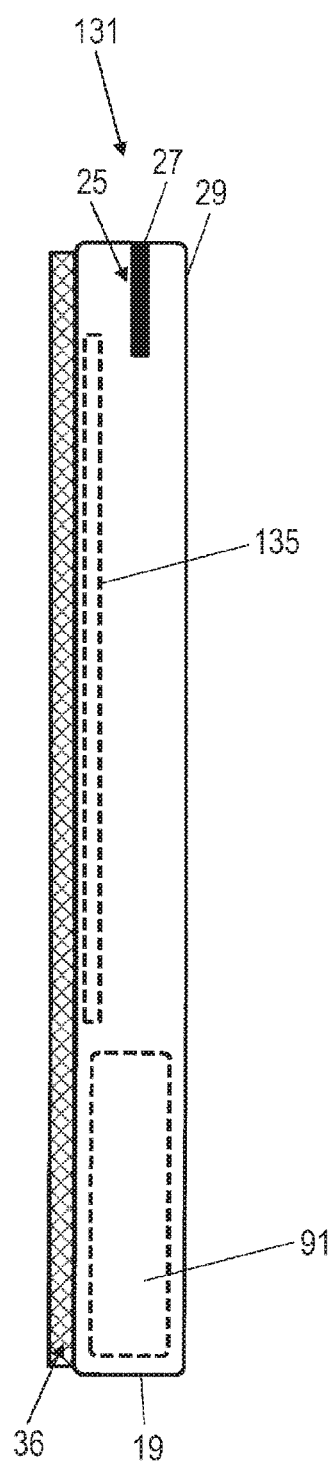
FIG. 13B is a side view illustrating the settlement terminal device, in which the third user interface is provided, according to the fourth embodiment.

Hereinabove, in third touch panel 125 which is described with reference to FIG. 11A or FIG. 12A, for example, a signature field may be displayed in order to input a signature as the authentication information, as illustrated in FIG. 13A. Third touch panel 125 illustrated in FIG. 13A is a security-guaranteed display input area in the secured mode for input as well as display. FIG. 13B is a side view illustrating settlement terminal device 131 illustrated in FIG. 13A.

Fifth Embodiment

Figure 14:
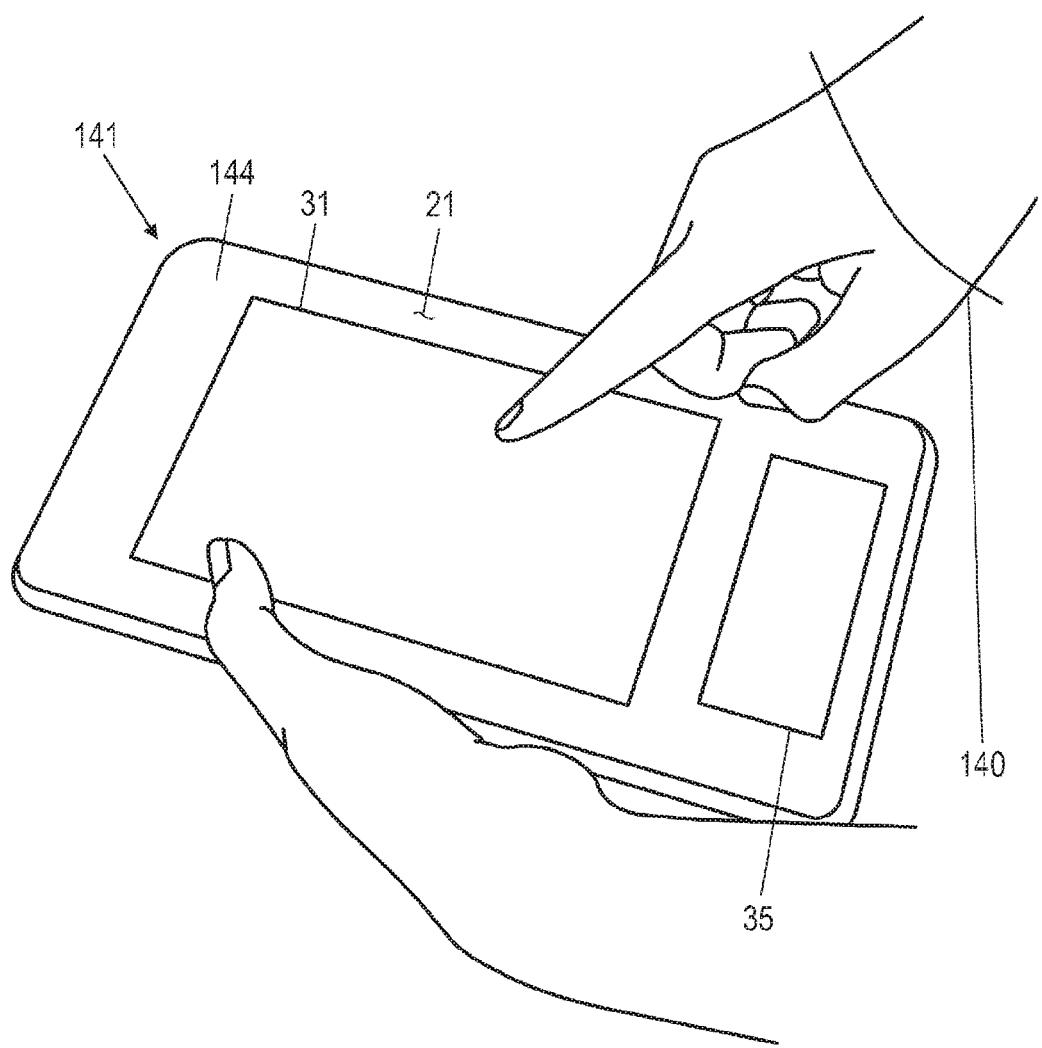
FIG. 14 is an operation explanation diagram illustrating an example of a situation, in which a service provider performs an operation and which is viewed from a side of the surface of a settlement terminal device, according to a fifth embodiment.
Figure 15:
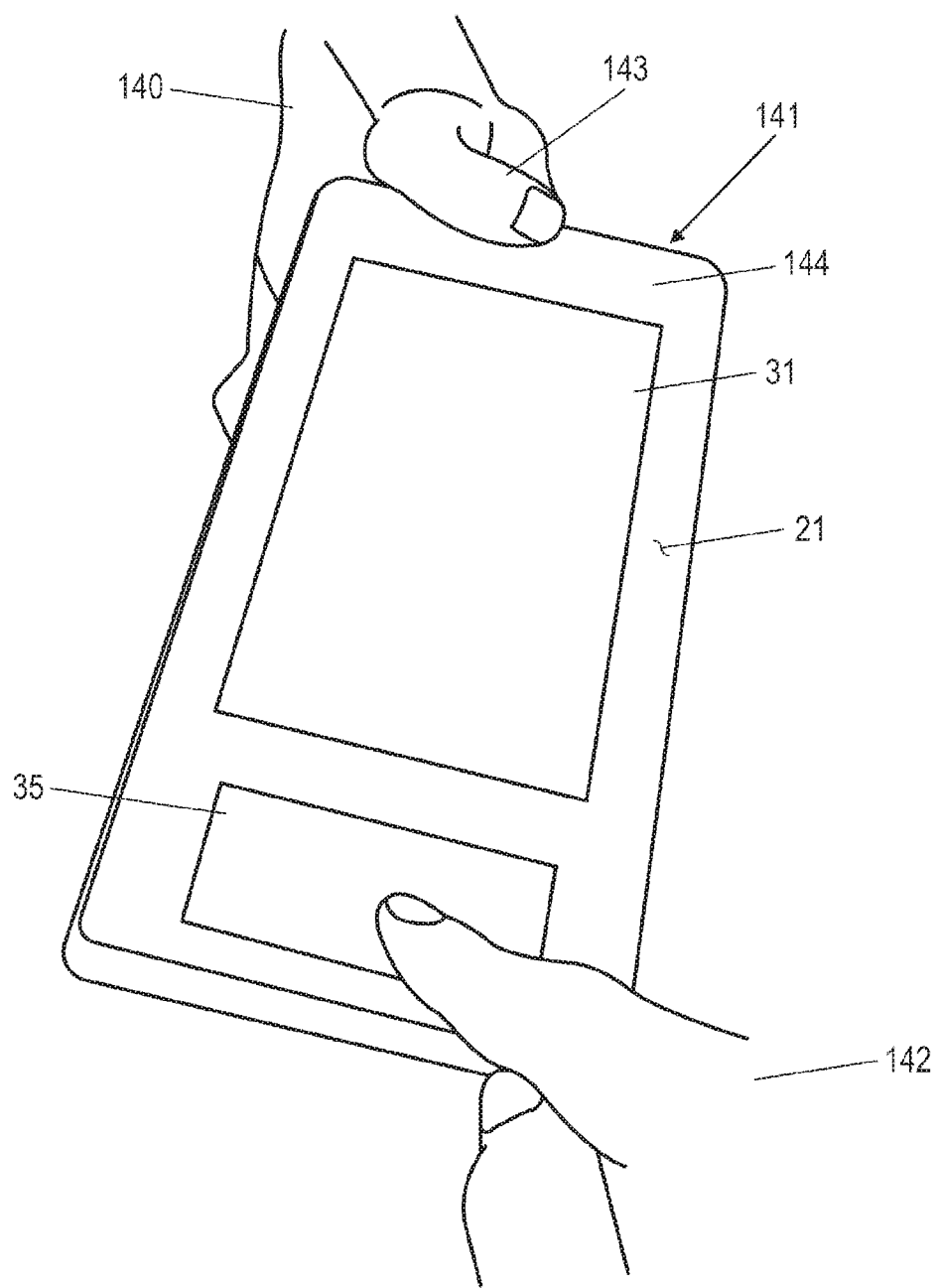
FIG. 15 is an operation explanation diagram illustrating a situation, in which the service provider holds a housing edge on a side opposite to a second user interface while picking up a first user interface of the settlement terminal device and a service recipient operates the second user interface, according to the fifth embodiment.

FIG. 14 is an operation explanation diagram illustrating an example of a situation, in which service provider 140 performs an operation and which is viewed from a side of the surface of settlement terminal device 141, according to a fifth embodiment. FIG. 15 is an operation explanation diagram illustrating a situation, in which service provider 140 holds a housing end portion on a side opposite to the second user interface (second touch panel 35) while picking up the first user interface (first touch panel 31) of settlement terminal device 141 and service recipient 142 operates the second user interface (second touch panel 35), according to the fifth embodiment.

Settlement terminal device 141 has portability. Settlement terminal device 141 has the same configuration as settlement terminal device 11 according to the first embodiment except that input keys 71 are omitted. Settlement terminal device 141 may have any one of configurations of the settlement terminal device according to the second to fourth embodiments, or may have a configuration acquired by applying the configurations.

Service provider 140 holds settlement terminal device 141 in a direction in which second touch panel 35 is disposed in front side rather than first touch panel 31, as illustrated in FIG. 14, until a step of inputting authentication information (for example, a PIN and, a signature) in, for example, the settlement process. In addition, service provider 140 inputs product information, a settlement method, payment money, and the number of times of payment using, for example, first touch input detector 47 included in first touch panel 31. In this step, for example, a magnetic card is passed through magnetic card reader 25 or a non-contact IC card is held vertically upward of antenna 135 which is connected to non-contact type IC card reader/writer 133.

Input/display of product information, a settlement method, payment money, and the number of times of payment, and display for urging to read a card in steps so far performed in the settlement process are performed using non-secured first touch panel 31. In a case in which reading of the card and input of product information, a settlement method, payment money, and the number of times of payment end, it is a timing in which the authentication information is input. In step until the authentication information is input, service provider 140 is the operator of settlement terminal device 141. In step in which authentication information is input, a person who performs settlement, that is, service recipient 142 is the operator of settlement terminal device 141.

In step in which authentication information is input, for example, service provider 140 holds the housing end portion on a side opposite to second touch panel 35 while picking up first touch panel 31 and causes the side of second touch panel 35 of settlement terminal device 141 to head for the side of service recipient 142, as illustrated in FIG. 15. In settlement terminal device 141, second touch panel 35 is in front rather than first touch panel 31 when viewed from the side of service recipient 142. In housing 19 of settlement terminal device 141, second touch panel 35 is placed in front rather than first information processor 15 when viewed from the operator who inputs the authentication information, that is, service recipient 142, and is provided in front rather than first touch panel 31 of operation display surface 21. With the configuration, second touch panel 35, in which a screen for inputting the authentication information, such as the PIN PAD or the signature field, is displayed, is disposed in a closer position than first touch panel 31 when viewed from the operator who inputs the authentication information. Therefore, according to settlement terminal device 141, comfortable operability is provided according to the operator or the difference in secured input/non-secured input. The service recipient 142 (operator who inputs the authentication information) can input the authentication information while checking the information, which is displayed on first touch panel 31, without being shielded by hand or the like for inputting the authentication information. In this step, security of input/display of the authentication information is secured.

In addition, in a case in which the authentication information is being input by the service recipient 142, service provider 140 grips the housing end portion on a side of non-secured first touch panel 31, which is positioned on a side opposite to secured second touch panel 35 of settlement terminal device 141, thereby supporting input performed by service recipient 142. Accordingly, authentication information is stably input by service recipient 142.

Furthermore, various types of business application software, which are operated by service provider 140, operate on first information processor 15 using a general-purpose platform. Accordingly, in a case in which settlement terminal device 141 is replaced by a newly-designed terminal device, it is easy to use the software resources thereof and the number of man-hours for development is reduced. Furthermore, first touch panel 31 (non-secured display area), which is controlled by first information processor 15 using the general-purpose platform, has wider display surface areas than second touch panel 35 (secured display area) which performs secured display. Therefore, it is possible to cope with various display forms according to business application software which operates on the general-purpose platform.

In settlement terminal device 141, non-contact type IC card reader/writer 133 is disposed in "secured" second information processor 17. Slit 27, which functions as the card slot of magnetic card reader 25, is disposed in "secured" or "non-secured" first information processor 15. In settlement terminal device 141, in a case in which the housing end portion is held on a side opposite to second touch panel 35 while picking up first touch panel 31 and second touch panel 35 is caused to head for the side of service recipient 142, thumb 143 which holds the housing end portion on a side opposite to second touch panel 35 is disposed on thumbprint surface 144. In a case in which thumb 143 stays in thumbprint surface 144, thumb 143 does not catch first touch panel 31. That is, thumb 143 does not touch first touch panel 31. Therefore, it is possible to prevent malfunction due to careless contact with first touch panel 31.

Although not illustrated in FIG. 14 and FIG. 15, a second secured area that includes second information processor 17, in which second touch panel 35 is provided, may include housing 19 having a color (and surface process) which is different from a first non-secured area which includes at least a part of first information processor 15. In addition, the background color of display in security-dedicated second touch panel 35 may be different from the background color of display of the non-secured area in first touch panel 31 which is provided in first information processor 15. This fact is the same as description performed with reference to FIG. 1A, FIG. 2, FIG. 4A, FIG. 7A, FIG. 9A, FIG. 10A or FIG. 11A according to the above-described another embodiment.

As above, according to settlement terminal device 141, it is possible to secure security, it is possible for service provider 140 to easily hold, and it is possible for service recipient 142 to easily perform settlement operation.

A settlement terminal device, which is the information processing device according to the present invention, includes a first information processor that is placed in a housing which is gripped by an operator, and is provided with a first user interface on one surface of the housing; a secured second information processor that is placed in the housing, and is provided with a tamper-resistant second user interface, which can perform a securable operation, on one surface of the housing; and one light transmitting member that is disposed to cover a surface of the first user interface and a surface of the second user interface.

According to the settlement terminal device, the housing can have robustness (falling impact resistance) due to one piece of light transmitting member which is disposed to cover the whole surface on which the first user interface and the second user interface are provided. Furthermore, the settlement terminal device can have smooth and comfortable operability in a case in which a finger, the input stylus pen, or the like of the operator moves between the secured second user interface and, for example, a non-secured first user interface (the first and second user interfaces include, for example, any of an input unit or a display unit, such as a touch panel). Furthermore, physical connection is generated between the secured portion and the non-secured portion, with the result that integrated feeling is acquired in appearance, thereby providing the information processing device (transaction terminal device) which is excellently designed.

In addition, in the settlement terminal device, the light transmitting member is disposed on one surface of the housing over a housing boundary between a secured area which includes a second information processor placement part and a non-secured area which includes at least a part of a first information processor placement part.

According to the settlement terminal device, the operator can move a finger, the input stylus pen, or the like between the two areas while explicitly recognizing the boundary between a part including a security-guaranteed input area and another area in the housing.

In addition, in the settlement terminal device, a secured state display unit, which performs at least any one of secured display indicative of a tamper-resistant secured mode, and non-secured display indicative of a non-tamper-resistant non-secured mode, is disposed on one surface of the housing between the first user interface and the second user interface, and the light transmitting member is disposed on one surface of the housing over the secured state display unit.

According to the settlement terminal device, the secured state display unit and the secured second user interface are provided in positions arranged together to be adjacent to each other in front, and are covered with one light transmitting member, together with the first user interface and second user interface. The settlement terminal device explicitly or implicitly indicates that the second user interface is an area, in which the safety of input of the authentication information (PIN or the like) is guaranteed, to the operator by causing the operator to visually recognize the turned-on/turned-off state of the secured state display unit which is closely disposed. Therefore, the operator can explicitly recognize that the second user interface is the area in which safety for inputting the authentication information is guaranteed, and can securely perform safe input of the authentication information to the security-guaranteed second user interface. Furthermore, the operator can smoothly move between the secured second user interface and, for example, the non-secured first user interface without hanging a finger, the input stylus pen, or the like on the secured state display unit.

In addition, in the settlement terminal device, a secured display area, which can perform secured display in the secured mode, is provided in the first user interface on a side which is close to the second user interface, and the light transmitting member is disposed over the boundary between the secured display area and another display area.

According to the settlement terminal device, the second information processor is formed to usually manage display control rights for the first user interface. Furthermore, the settlement terminal device causes the operator to visually recognize display for urging the operator to input the authentication information (PIN or the like) and display for indicating the position of the security-guaranteed input area in the secured display area of the first user interface. Therefore, the operator can smoothly move a finger, the input stylus pen, or the like between the two areas while recognizing the boundary between a part which includes the security-guaranteed input area and another area in the first user interface.

In addition, in the settlement terminal device, the secured area and another area of the first user interface display backgrounds which are different from each other.

According to the information processing device, it is possible to further cause the operator to explicitly recognize the boundary between a part which includes the security-guaranteed area and another area in the first user interface.

In addition, in the settlement terminal device, a switching display area, in which secured content is displayed in the secured mode and non-secured content is displayed in the non-secured mode, is provided in the first user interface on a side which is close to the second user interface rather than (opposite to) a non-secured display area in which the non-secured content is displayed in any of the secured mode and the non-secured mode.

According to the settlement terminal device, the second information processor is formed to usually manage the display control rights for the first user interface. Furthermore, the settlement terminal device causes the operator to visually recognize that the switching display area of the first user interface is an area in which the safety of display for urging to input the authentication information (PIN or the like) in the secured mode is guaranteed. The operator can smoothly move a finger, the input stylus pen, or the like between the two areas while recognizing the boundary between the switching display area and another area of the first user interface in the secured mode. Furthermore, the operator recognizes that the whole first user interface is the non-secured input area in the non-secured mode. In the non-secured mode, the operator can smoothly move a finger, the input stylus pen, or the like between the secured second user interface and, for example, the non-secured first user interface.

In addition, in the settlement terminal device, the switching display area and the non-secured display area display the same background in the non-secured mode, and the switching display area and the non-secured display area display backgrounds which are different from each other in the secured mode.

According to the settlement terminal device, it is possible to cause the operator to further explicitly recognize the boundary between the security-guaranteed area and another area in the first user interface in each of the secured mode/non-secured mode.

In addition, in the settlement terminal device, the light transmitting member is disposed on the operation display surface of the housing over the housing boundary between a first housing area which includes at least a part of the first information processor placement part and a second housing area which includes the second information processor placement part.

According to the settlement terminal device, the housing boundary between the secured area and the non-secured area is covered with one light transmitting member, together with the first user interface and second user interface. The housing has, for example, different colors or different surface processes are performed thereon along the housing boundary. Furthermore, a groove or a projection portion may be provided in the housing boundary. The light transmitting member is disposed to cover the groove or the projection portion. In the settlement terminal device, it is possible to cause the operator to explicitly recognize that the second user interface is the area, in which the safety of input of the authentication information (PIN or the like) is guaranteed, by causing the operator to visually recognize the housing boundary nearly disposed. The operator can move a finger, the input stylus pen, or the like between the secured display area and the non-secured display area over the housing boundary during the operation.

In addition, in the settlement terminal device, a secured state display area, in which at least any one of secured display indicative of a tamper-resistant secured mode, and non-secured display indicative of a non-tamper-resistant non-secured mode is displayed, is provided in the first user interface on a side which is close to the second user interface.

According to the settlement terminal device, it is possible to cause the operator to further explicitly recognize that the input of the authentication information to the second user interface is secure in the secured mode.

In addition, in the settlement terminal device, a third input display unit that includes a secured display area, in which secured content is displayed, is disposed between the first user interface and the second user interface, and the light transmitting member is disposed over the third input display unit.

According to the settlement terminal device, the second user interface and the third user interface are provided in front positions arranged together to be adjacent to each other, and the third user interface is covered with one light transmitting member, together with the first user interface and the second user interface. The second user interface and the third user interface are disposed in positions separated from the non-secured first user interface, grouped, and then separated from the first user interface. Therefore, the settlement terminal device can further clearly know that the second user interface is an area in which the safety of input of the authentication information (PIN or the like) is guaranteed for the operator. Furthermore, the operator can smoothly move a finger, the input stylus pen, or the like over the first user interface, the second user interface and the third user interface during the operation.

In addition, in the settlement terminal device, the light transmitting member is disposed on an operation display surface of the housing over a housing boundary between a first housing area which includes at least a part of a first information processor placement part and a second housing area which includes a second information processor placement part, and, in the first user interface and the second user interface, a display boundary between a secured display area and a non-secured display area and a housing boundary between the first housing area and the second housing area are disposed in different positions in a direction, in which the first user interface and the second user interface are arranged, in at least a part of operation modes.

According to the settlement terminal device, it is possible to cause the operator to visually recognize that the secured area, which includes the second information processor placement part is usually the area in which the safety of input of the authentication information (PIN or the like) is guaranteed. Furthermore, the secured level of the undefined-secured level area between the secured/non-secured boundary in the housing and secured display/non-secured display boundary in the operation display surface changes according to the operation modes. The settlement terminal device can cause the operator to visually recognize the secured level.

INDUSTRIAL APPLICABILITY

The present invention is available for a settlement terminal device and a transaction terminal device which are used to perform a settlement process during a transaction.

Hereinabove, although various embodiments have been described with reference to the accompanying drawings, the disclosure is not limited to the examples. Those skilled in the art will appreciate that various changes and modifications are possible in the scope disclosed in the claims, and those changes and modifications belong to the technical scope of the disclosure.

REFERENCE MARKS IN THE DRAWINGS 11, 93, 97, 121, 123, 131, 141 Settlement terminal device
15 First information processor
17 Second information processor
19 Housing
21 Operation display surface
25 Magnetic card reader
31 First touch panel (first user interface)
35 Second touch panel (second user interface)
36 Surface panel (light transmitting member)
95A, 101 Non-secured LED (secured state display unit)
95B, 99 Secured LED (secured state display unit)
103 Secured display area
103A Switching display area
105 Non-secured display area (another display area)
119 Secured state display area (secured state display unit)
125 Third touch panel (third user interface)

The invention claimed is:

1. A settlement terminal device, comprising:
a housing that is configured to be gripped by an operator, the housing including an operation display surface, the operation display surface defining a first opening and a second opening, the operation display surface including an interposed portion that is physically between the first opening and the second opening;
a first information processor that is in the housing and provided with a first user interface in the first opening of the operation display surface of the housing;
a secured second information processor that is in the housing and provided with a tamper-resistant second user interface, which is configured to perform a securable operation, in the second opening of the operation display surface of the housing; and
one light transmitting member that is disposed to continuously cover, above the operation display surface of the housing, the first user interface, the interposed portion, and the second user interface,
wherein, in a direction perpendicular to the operation display surface of the housing, a periphery of an upper surface of the light transmitting member entirely protrudes above a periphery of the housing and is continuously exposed without including a groove or a projection portion between the first user interface and the second user interface and without contacting or abutting the housing.

2. The settlement terminal device of claim 1,
wherein the light transmitting member is disposed on one surface of the housing over a housing boundary between a secured area which includes a second information processor placement part and a non-secured area which includes at least a part of a first information processor placement part.

3. The settlement terminal device of claim 1,
wherein a secured state display, which performs at least one of secured display indicative of a tamper-resistant secured mode or non-secured display indicative of a non-tamper-resistant non-secured mode, is disposed on the interposed portion of the operation display surface of the housing between the first user interface and the second user interface, and
wherein the light transmitting member is disposed on one surface of the housing over the secured state display.

4. The settlement terminal device of claim 3,
wherein a secured display area, which is configured to perform secured display in the secured mode, is provided in the first user interface on a side which is close to the second user interface, and
wherein the light transmitting member is disposed over a boundary between the secured display area and another display area.

5. The settlement terminal device of claim 4,
wherein, in the first user interface, the secured display area and another area display backgrounds which are different from each other.

6. The settlement terminal device of claim 3,
wherein a switching display area, in which secured content is displayed in the secured mode and non-secured content is displayed in the non-secured mode, is provided in the first user interface on a side which is close to the second user interface rather than a non-secured display area in which the non-secured content is displayed in any of the secured mode and the non-secured mode.

7. The settlement terminal device of claim 6,
wherein the switching display area and the non-secured display area display a same background in the non-secured mode, and the switching display area and the non-secured display area display backgrounds which are different from each other in the secured mode.

8. The settlement terminal device of claim 1,
wherein a secured state display area, in which at least one of secured display indicative of a tamper-resistant secured mode or non-secured display indicative of a non-tamper-resistant non-secured mode, is provided in the first user interface on a side which is close to the second user interface.

9. The settlement terminal device of claim 1,
wherein a third input display that includes a secured display area, in which secured content is displayed, is disposed between the first user interface and the second user interface, and
wherein the light transmitting member is disposed over the third input display.

10. The settlement terminal device of claim 1,
wherein the light transmitting member is disposed on the operation display surface of the housing over a housing boundary between a first housing area which includes at least a part of a first information processor placement part and a second housing area which includes a second information processor placement part, and
wherein, in the first user interface and the second user interface, a display boundary between a secured display area and a non-secured display area and the housing boundary between the first housing area and the second housing area are disposed in different positions in a direction, in which the first user interface and the second user interface are arranged, in at least a part of operation modes.

11. A settlement terminal device, comprising:
a housing that is configured to be gripped by an operator, the housing including an operation display surface, the operation display surface defining a first opening and a second opening, the operation display surface including an interposed portion that is physically between the first opening and the second opening;
a first information processor that is in the housing and provided with a first user interface, which is configured to display money and perform operation input as non-secured content relevant to settlement, in the first opening of the operation display surface of the housing;
a secured second information processor that is in the housing and provided with a tamper-resistant second user interface, which is configured to perform a securable operation, in the second opening of the operation display surface of the housing; and
one light transmitting member that is disposed to continuously cover, above the operation display surface of the housing, the first user interface, the interposed portion, and the second user interface,
wherein the first user interface includes a non-securable operation area, which is configured to display money relevant to the settlement and is configured to operate a non-secured input, in at least a part thereof,
wherein the light transmitting member is disposed over a boundary between a non-securable operation area and a securable operation area that includes at least the second user interface, performs input of authentication information used for the settlement, and performs display which enables the input of the authentication information, and
wherein, in a direction perpendicular to the operation display surface of the housing, a periphery of an upper surface of the light transmitting member entirely protrudes above a periphery of the housing and is continuously exposed without including a groove or a projection portion over the boundary between the non-securable operation area and the securable operation area and without contacting or abutting the housing.

12. The settlement terminal device of claim 11, further comprising:
a card reader that reads information which is stored in a card placed in the housing; and
an insertion opening that allows insertion of the card into the card reader,
wherein the insertion opening is provided on a side surface of the housing that connects a disposition surface of the light transmitting member to a rear surface of the housing opposite to the disposition surface of the light transmitting member.

13. The settlement terminal device of claim 11,
wherein the light transmitting member is disposed on one surface of the housing over a housing boundary between a secured area which includes a second information processor placement part and a non-secured area which includes at least a part of a first information processor placement part.

14. The settlement terminal device of claim 11,
wherein a secured state display, which performs at least one of secured display indicative of a tamper-resistant secured mode or non-secured display indicative of a non-tamper-resistant non-secured mode, is disposed on the interposed portion of the operation display surface of the housing between the first user interface and the second user interface, and
wherein the light transmitting member is disposed on one surface of the housing over the secured state display.

15. The settlement terminal device of claim 14,
wherein a secured display area, which is capable of performing secured display in the secured mode, is provided in the first user interface on a side which is in a vicinity of the second user interface, and
wherein the light transmitting member is disposed over a boundary between the secured display area and another display area.

16. The settlement terminal device of claim 15,
wherein, in the first user interface, the secured display area and another area display backgrounds which are different from each other.

17. The settlement terminal device of claim 14,
wherein a switching display area, in which secured content is displayed in the secured mode and non-secured content is displayed in the non-secured mode, is provided in the first user interface on a side which is close to the second user interface rather than a non-secured display area in which the non-secured content is displayed in any of the secured mode and the non-secured mode.

18. The settlement terminal device of claim 17,
wherein the switching display area and the non-secured display area display a same background in the non-secured mode, and the switching display area and the non-secured display area display backgrounds which are different from each other in the secured mode.

19. The settlement terminal device of claim 11,
wherein a secured state display area, in which at least one of secured display indicative of a tamper-resistant secured mode or non-secured display indicative of a non-tamper-resistant non-secured mode, is provided in the first user interface on a side which is close to the second user interface.

20. The settlement terminal device of claim 11,
wherein a third input display that includes a secured display area, in which secured content is displayed, is disposed between the first user interface and the second user interface, and
wherein the light transmitting member is disposed over the third input display.

21. The settlement terminal device of claim 20,
wherein the light transmitting member is disposed on the operation display surface of the housing over a housing boundary between a first housing area which includes at least a part of a first information processor placement part and a second housing area which includes a second information processor placement part, and
wherein, in the first user interface and the second user interface, a display boundary between a secured display area and a non-secured display area and the housing boundary between the first housing area and the second housing area are disposed in different positions in a direction, in which the first user interface and the second user interface are arranged, in at least a part of operation modes.

22. The settlement terminal device of claim 1,
wherein the first user interface includes a first transparent sheet,
wherein the second user interface includes a second transparent sheet,
wherein the one light transmitting member is a third transparent sheet, and
wherein the third transparent sheet is disposed to continuously cover, above the operation display surface of the housing, the first transparent sheet, the interposed portion, and the second transparent sheet.

23. The settlement terminal device of claim 1,
wherein the one light transmitting member is disposed directly over the interposed portion of the operation display surface of the housing.

* * * * *